(12) United States Patent
Ivancich et al.

(10) Patent No.: US 10,929,466 B2
(45) Date of Patent: Feb. 23, 2021

(54) EFFICIENT DISTRIBUTED INDEXING OF CLUMPY DATA

(71) Applicant: Red Hat, Inc., Raleigh, NC (US)

(72) Inventors: John Eric Ivancich, Ann Arbor, MI (US); Adam Charles Emerson, Ann Arbor, MI (US); Matthew William Benjamin, Ann Arbor, MI (US)

(73) Assignee: Red Hat, Inc., Raleigh, NC (US)

( * ) Notice: Subject to any disclaimer, the term of this patent is extended or adjusted under 35 U.S.C. 154(b) by 301 days.

(21) Appl. No.: 15/980,347

(22) Filed: May 15, 2018

(65) Prior Publication Data
US 2019/0354637 A1    Nov. 21, 2019

(51) Int. Cl.
*G06F 16/00*    (2019.01)
*G06F 16/901*   (2019.01)
*G06F 3/06*     (2006.01)
*G06F 17/14*    (2006.01)
*G06F 16/903*   (2019.01)

(52) U.S. Cl.
CPC .......... *G06F 16/901* (2019.01); *G06F 3/0644* (2013.01); *G06F 16/903* (2019.01); *G06F 17/141* (2013.01)

(58) Field of Classification Search
CPC .................................................... G06F 16/278
See application file for complete search history.

(56) References Cited

U.S. PATENT DOCUMENTS

| 8,386,540 B1* | 2/2013 | McAlister | G06F 16/256 707/899 |
| 8,392,482 B1* | 3/2013 | McAlister | G06F 16/1727 707/899 |
| 2012/0143873 A1* | 6/2012 | Saadat | G06F 16/2228 707/741 |
| 2016/0171071 A1* | 6/2016 | Beisiegel | G06F 16/278 707/715 |

OTHER PUBLICATIONS

Data Distribution; Aerospike, Inc.; 2018; (6 pages).
Sharding for startups by Eric Ries; http://www.startuplessonslearned.com/2009/01/sharding-for-startups.html; Jan. 4, 2009; retrieved Mar. 23, 2018; pp. 1-10.
(Continued)

*Primary Examiner* — Hung Q Pham
(74) *Attorney, Agent, or Firm* — K&L Gates LLP

(57) ABSTRACT

Efficient distributed indexing of clumpy data is disclosed. For example, a plurality of data stores store a plurality of data objects, where a plurality of data references to each of the plurality of data objects is recorded on a distributed index and an index manager executes a processor to temporarily partition a namespace of the plurality of data references into a plurality of temporary partitions. A respective count of data references in each temporary partition is computed. A trend line approximating a distribution of data references is calculated based on the respective counts. A cumulative representation of the distribution of the respective counts is calculated based on the trend line. The namespace is repartitioned based on the cumulative representation resulting in a repartitioned namespace, where the distributed index is divided into index segments based on the repartitioned namespace.

14 Claims, 10 Drawing Sheets

(56) References Cited

OTHER PUBLICATIONS

Database Sharding; posted on Nov. 20, 2014 by Ganesh P S filed under Enterprise; DeveloperIQ; Learn 101 Advanced Linux Skills; pp. 1-18.

Sharding Introduction; MongoDB Manual 3.0; https://docs.mongodb.com/v3.0/core/sharding-introduction; 2013, retrieved Mar. 23, 2018 pp. 1-8.

* cited by examiner

EFFICIENT DISTRIBUTED INDEXING OF CLUMPY DATA

BACKGROUND

The present disclosure generally relates to storing data in distributed storage nodes. In computer systems, data is typically processed to yield results. Processing large amounts of data may require similarly large amounts of data storage. Where storage requirements of a computer system exceed the storage capacity of a given computing node, multiple storage nodes may be implemented to distribute the storage of the data. These additional nodes may also handle certain processing tasks relating to the data in parallel. In order to retrieve data stored in memory devices, an index of the data entries is typically implemented. The index of data entries may be queried for the respective physical storage locations of each given data entry in the storage system.

SUMMARY

The present disclosure provides a new and innovative system, methods and apparatus for efficient distributed indexing of clumpy data. In an example, a plurality of data stores store a plurality of data objects, where a plurality of data references to each of the plurality of data objects is recorded on a distributed index and an index manager executes a processor to temporarily partition a namespace of the plurality of data references into a plurality of temporary partitions. A respective count of data references in each temporary partition is computed. A trend line approximating a distribution of data references is calculated based on the respective counts. A cumulative representation of the distribution of the respective counts is calculated based on the trend line. The namespace is repartitioned based on the cumulative representation resulting in a repartitioned namespace, where the distributed index is divided into index segments based on the repartitioned namespace.

Additional features and advantages of the disclosed method and apparatus are described in, and will be apparent from, the following Detailed Description and the Figures.

DETAILED DESCRIPTION OF EXAMPLE EMBODIMENTS

Figure 1:
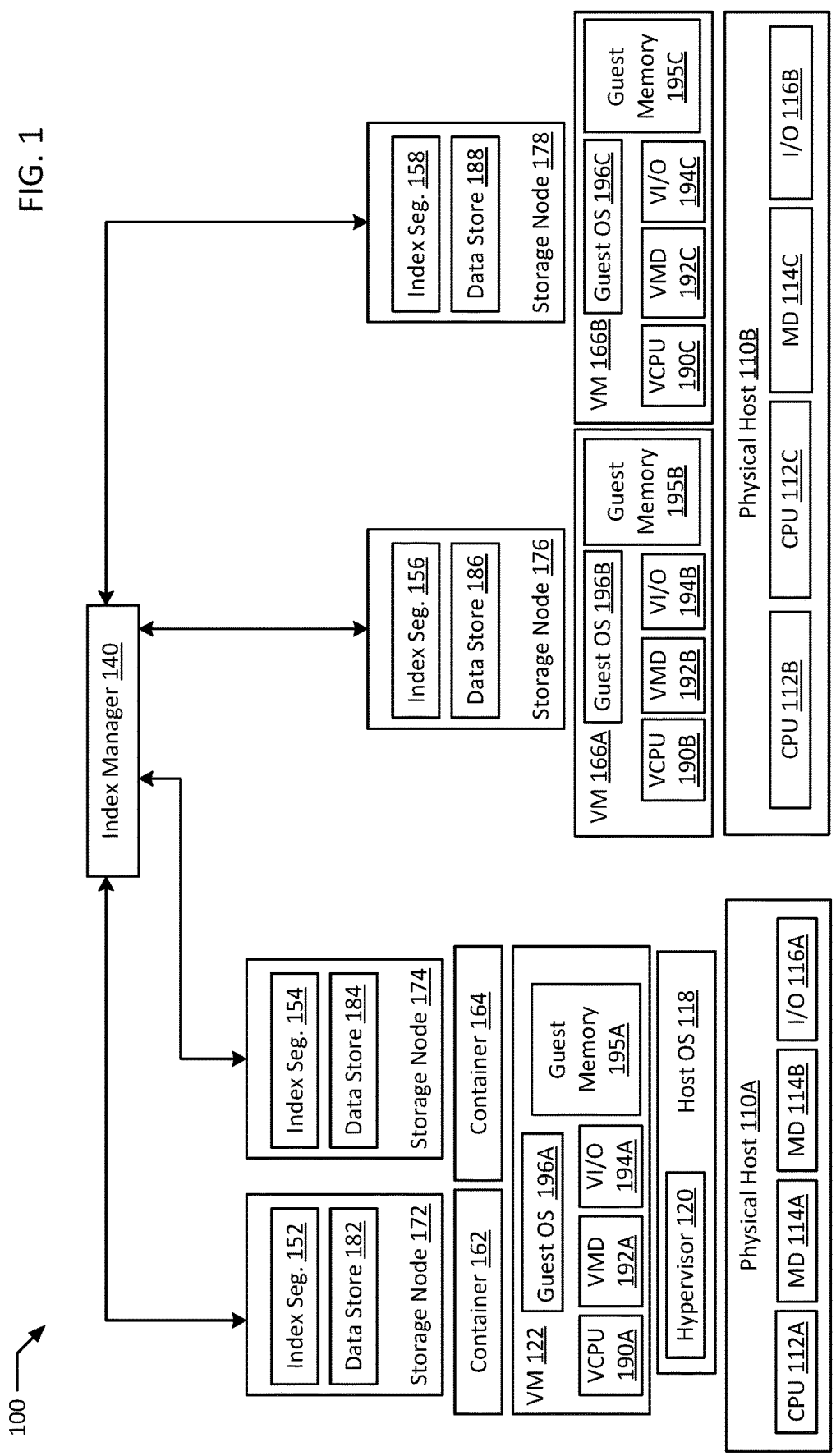
FIG. 1 is a block diagram of an efficient distributed indexing of data system according to an example of the present disclosure.

Data stored in computer systems typically requires some form of structure for efficient storage and retrieval. Typically, an index may be implemented to include key features of the data stored (e.g., a name, size, and memory location). Data may be organized in various units of storage, for example, as files or objects, which may in turn be organized in containers (e.g., directories, databases, buckets, etc.) to provide additional structure for ease of retrieval. As data storage grows in size for a given computer system, the data may be required to be spread out over multiple distributed physical and/or virtual hosts. Indexing the data gets ever more complex as the number of storage nodes in the computer system increases. Different distributed storage solutions (e.g., Red Hat® Ceph®, OpenStack® Swift, Amazon S3®, etc.) may adopt different terminology, however, a core concept of compartmentalizing storage into some form of subunit or bucket is generally implemented, at least on a per user and/or per account level to provide some logical structure to the storage. Individual named data objects may then be stored in these buckets. To allow a user to locate their data, an index is typically generated.

The index presents several challenges in that a monolithic index becomes a single point of failure, and any host hosting an index will receive a disproportionate amount of network traffic and also processor usage from queries to the index. While replication alleviates the failure risks, at large scale it doesn't alleviate the computing overhead challenges, instead it often exacerbates the computing overhead and computing bottleneck issues. Allowing updates via multiple replicated indexes on multiple gateways may well introduce risks to data consistency (e.g., if competing updates are introduced via different gateways). A locking mechanism may help alleviate the consistency risks, but then the locking mechanism itself will require significant network, processor, and I/O overhead as locks are placed and released across multiple nodes. A typical solution then, is to divide the index into shards or segments to split both the network load and the processing load across multiple hosts. A client and/or gateway used to access the distributed storage system may be configured with an index of index shards to identify which shard to query for a given data entry. To evenly distribute the index, a typical implementation may hash the names of the data objects so that they become relatively evenly distributed within the range of values of the hash function.

However, sharding an index by hashing object names leads to additional drawbacks. For example, a given data set may have several separate stored objects (e.g., mydata1, mydata2, mydata3). In the example, the hash values generated by the three object names may typically be very different, and therefore to retrieve all three objects to perform a computing task, instead of querying one index shard for the location of the three files, a user may end up querying three different index shards, which may be located on three separate physical nodes, thereby incurring context switches and processor inefficiencies on each node. Therefore, while the bottleneck of having index queries queued on a central index node may be alleviated, the excess network overhead and inefficient use of processor resources remains. The hashing solution works well for systems where objects are typically accessed on an individual basis but leads to significant amounts of inefficient processing overhead on systems where data operations are performed on a range of objects at once. The problem is compounded with automatically generated data (e.g., log files) which may all be named with a given prefix and then further labeled with a suffix such as a timestamp (e.g., sensor-data-YYYY-MM-DD-HH:MM:SS.SSS). In an example, retrieving sensor data for a full month (e.g., sensor-data-2017-01-01-00:00:00.000 through sensor-data-2017-01-31-23:59:59.999) may end up requiring querying of all of the index shards, in some cases thousands of shards) to be queried because the exact file names for each object may not be known, for example, where sensor data is rolled into new data objects based on object size rather than timestamp.

In various examples, distributed storage systems may be implemented with virtualization to allow for flexible scaling of computing resources, for example, in a multi-tenant cloud environment. In an example, a virtual machine ("VM") may be a robust simulation of an actual physical computer system utilizing a hypervisor to allocate physical resources to the virtual machine. In some examples, a container based virtualization system, for example, one managed by a container manager such as Red Hat® OpenShift® executing a containerization runtime environment such as Docker® may be advantageous, as container based virtualization systems may be lighter weight than systems using virtual machines with hypervisors. In the case of containers, oftentimes a container will be hosted on a physical host or virtual machine that already has an operating system executing, and the container may be hosted on the operating system of the physical host or VM. In large scale implementations, container schedulers, such as those included in container orchestrators (e.g., Kubernetes®), generally respond to frequent container start-ups and cleanups with low latency. Containers may enable wide spread, parallel deployment of computing power for specific tasks. In a typical example, a container may be instantiated to process a specific task and reaped after the task is complete. In an example, virtualized guests may be implemented to host individual storage nodes of the distributed storage system, but, in order to take full advantage of the scalability offered by virtualization, a distributed storage system may require flexible scaling of any index system associated with the distributed storage system. As the number of host nodes and/or index segments increases, searching for a particular series of objects based on a naming convention may begin to generate high amounts of network and processing overhead as an ever larger number of nodes are queried for data that is not present on those nodes. In an example, a failed query may also take a longer time on average to respond than a successful query where, for example, a result is found before each record is evaluated.

The present disclosure aims to address the performance deficiencies of network storage solutions while maintaining the scalability advantages of distributed storage networks by implementing efficient distributed indexing of clumpy data. In an example, data stored in distributed storage environments is observed to be clumpy due to typical programming and naming methodology. In these examples, there are actually several competing factors related to system performance efficiency, namely the usage of network, processor, and storage I/O resources. In the example, a frequent observation is that similarly named data objects are often accessed together, thereby creating synergistic effects for reduced network, processor, and storage I/O usage if index references to these similarly named data objects may be retrieved with a minimal number of index queries across a network. In addition, querying fewer index segments for a given query may save on processor and network overhead, even if index segments are not uniform in size. Therefore, for example, if all of the references data objects for a given user account or process were concentrated in a few index segments, even if those index segments were disproportionately large, the net efficiency of querying, for example, three large index segments will be higher than querying ten proportionately smaller index segments on different hosts. Given that these observations apply to typical data distributions in multi-tenant cloud environments, a form of lossy compression may be applied to the actual distribution of object names across a defined namespace of the data objects, for example, by matching a trend line of the distribution of object names to an estimated distribution of data objects. In the example, by integrating the trend line of the general trend of object name distribution, and then dividing the resulting integral line into equal sized segments by integrated object name count, index segments may be generated that differ in size of namespace coverage while generally holding substantially similar numbers of object references in each index segment. Clumpiness in the data is reflected in that peaks in naming density in the name space will be clustered within a few contiguous index segments, thereby limiting the index segments queried for a given data request. The index itself may also be represented in compact, compressed form based on a calculated representation of the trend line or integrated trend line, which may be transferred in an index file in lieu of a list of alphanumerical dividing points between index segments. The compressed index file may reduce network load for transferring the index between an index manager, index segment hosts, and end user clients. In addition, by clustering similar object names on consecutive index segments in a predictable manner, queries may be made to a few concentrated index segments rather than inefficiently scanning many index segments. In an example, a memory location of a data object to be retrieved may be a small fraction of the size of a network transmission envelope encompassing the location data, so having one index segment respond with one message with ten locations of ten data objects may take an order of magnitude less network traffic than ten index segments each responding with one location. Therefore, efficiently clustering related index entries together may produce dramatic network bandwidth reductions for index queries.

FIG. 1 is a block diagram of an efficient distributed indexing of data system according to an example of the present disclosure. The system 100 may include one or more physical host(s) 110A-B. Physical hosts 110A-B may in turn include one or more physical processor(s) (e.g., CPUs 112A-C) communicatively coupled to memory device(s) (e.g., MD 114A-C) and input/output device(s) (e.g., I/O 116A-B). As used herein, physical processor or processors 112A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-C refers to volatile or non-volatile memory devices, such as RAM, ROM, EEPROM, or any other device capable of storing data. In an example, memory devices 114A-C may be persistent storage devices such as hard drive disks ("HDD"), solid state drives ("SSD"), and/or persistent memory (e.g., Non-Volatile Dual In-line Memory Module ("NVDIMM")). Memory devices 114A-C may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A-B refer to devices capable of providing an interface between one or more processor pins and an external device, the operation of which is based on the processor inputting and/or outputting binary data. CPU(s) 112A-C may be interconnected using a variety of techniques, ranging from a point-to-point processor interconnect, to a system area network, such as an Ethernet-based network. Local connections within physical hosts 110A-B, including the connections between processors 112A-C and memory devices 114A-C and between processors 112A-C and I/O device 116A-B may be provided by one or more local buses of suitable architecture, for example, peripheral component interconnect (PCI).

In an example, physical host 110A may run one or more isolated guests, for example, VM 122, which may in turn host additional virtual environments (e.g., VMs and/or containers). In an example, a container (e.g., containers 162 and 164) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers 162 and 164 may run directly on a host operating system (e.g., host OS 118) or run within another layer of virtualization, for example, in a virtual machine (e.g., VM 122). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 122 may be a VM executing on physical host 110A.

System 100 may run one or more VMs (e.g., VMs 122), by executing a software layer (e.g., hypervisor 120) above the hardware and below the VM 122, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 122 as devices, including virtual central processing unit ("VCPU") 190A, virtual memory devices ("VIVID") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 122 may be a virtual machine and may execute a guest operating system 196A which may utilize the underlying VCPU 190A, VIVID 192A, and VI/O 194A. Processor virtualization may be implemented by the hypervisor 120 scheduling time slots on physical processors 112A such that from the guest operating system's perspective those time slots are scheduled on a virtual processor 190A. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196A such as guest memory 195A provided to guest OS 196A.

In an example, VMs 166A and 166B may be similar virtualization implementations to VM 122, but may, for example, execute separate operating systems (e.g., guest OS 196B-C). In an example, guest OSses 196BC may be incompatible with guest OS 196A and/or host OS 118. In an example, VMs 166A-B execute on physical host 110B, with VCPU 190B-C, VIVID 192B-C, VI/O 194B-C, and guest memory 195B-C virtualizing access to physical CPU 112B-C, MD 114C, and I/O 116B.

In an example, a distributed storage system may include multiple storage nodes (e.g., storage nodes 172, 174, 176, and 178). In the example, storage nodes 172, 174, 176, and 178 of the distributed storage system may be flexibly hosted on a variety of physical and/or virtual hosts (e.g., containers 162 and 164, VMs 166A-B). In an example, any form of suitable network for enabling communications between computing devices, for example, a public network (e.g., the Internet), a private network (e.g., a local area network (LAN) or wide area network (WAN)), or a combination thereof may be employed to connect the component parts of the distributed storage system (e.g., storage nodes 172, 174, 176, and 178, index manager 140) to each other. In an example, index manager 140 may be implemented via any suitable form of computing module (e.g., application, executable, script, hardware module, etc.). In an example, index manager 140 may manage access to the distributed storage system. In an example, index manager 140 may be implemented in a network gateway (e.g., Red Hat® Rados Gateway®) through which client devices access the distributed storage network.

In an example, as additional storage is required, additional containers or VMs may be instantiated to add storage nodes to the distributed storage system. In an example the distributed storage system depicted in system 100 may be object oriented storage storing data objects. In another example, the distributed storage system in system 100 may be a distributed file system (e.g., GlusterFS®). In either example, index manager 140 may be responsible for directing access requests to data and/or files stored in the distributed storage system based on an index of the data stored in system 100. In an example, the index is distributed in index segments (e.g., index segments 152, 154, 156, and 158). In an example, index segments 152, 154, 156, and 158 may be part of storage nodes 172, 174, 176, and 178. In an example, index segments 152, 154, 156, and 158 may be subindexes of the data in data stores 182, 184, 186, and 188. In an example, each index segment (e.g., index segments 152, 154, 156, and 158) may be indexes of the data in the respective data store (e.g., data stores 182, 184, 186, and 188) associated in the same storage node (e.g., storage nodes 172, 174, 176, and 178) as the respective index segments 152, 154, 156, and 158. In another example, index entries in index segments 152, 154, 156, and 158 may be independent of the data stored in the same storage node as the respective index segments. For example, index manager 140 may periodically reindex the data stored in system 100 and upon reindexing, a given index segment 152, 154, 156, and 158 may shift responsibilities to a different segment of the namespace of the data objects in system 100. An index segment may therefore include data locations on a separate storage node from the index segment itself. In some examples, index segments may be implemented independently of data stores. For example, index segments may be implemented on different containers from data stores, and index segments may scale independently of data stores. In an example, a system storing small data objects may require more index segments and index entries to map the same amount of storage space as a system storing large data objects. In an example, index manager 140 may be implemented as part of a storage controller and/or virtualization orchestrator of system 100.

In an example, a client device accessing the distributed storage system of storage nodes 172, 174, 176, and 178 may connect to a storage gateway (e.g., a node hosting index manager 140). In an example, index manager 140 provides an index of index segments to the client device upon a session being established between index manager 140 and the client device. In the example, when the client device requests access to a data file, the client device first determines, based on the index file from index manager 140, the appropriate index segment (e.g., index segments 152, 154, 156, or 158) to access to retrieve a record of a location of the respective data object. The appropriate data store (e.g., data store 182, 184, 186, and/or 188) is accessed for the data object. Updates are made to both the index segment of the data reference and the data store where the data is located. In an example, index manager 140 periodically triggers reindexing of the index segments 152, 154, 156, and 158, for example, based on a time elapsed (e.g., every Saturday night at 3 AM) or a count of data transactions.

Figure 2A:
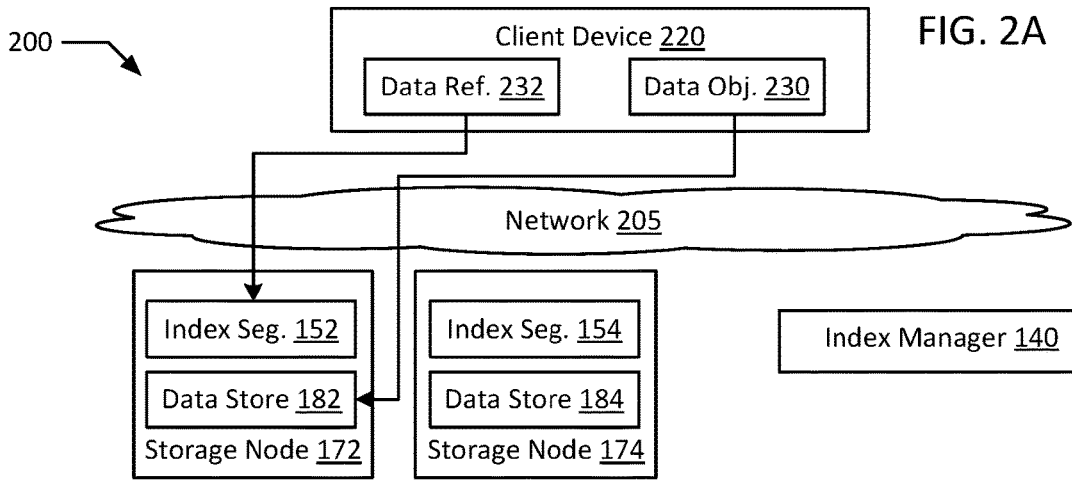
FIGS. 2A-C are block diagrams illustrating data storage and retrieval in a system employing efficient distributed indexing of data according to an example of the present disclosure.
Figure 2B:
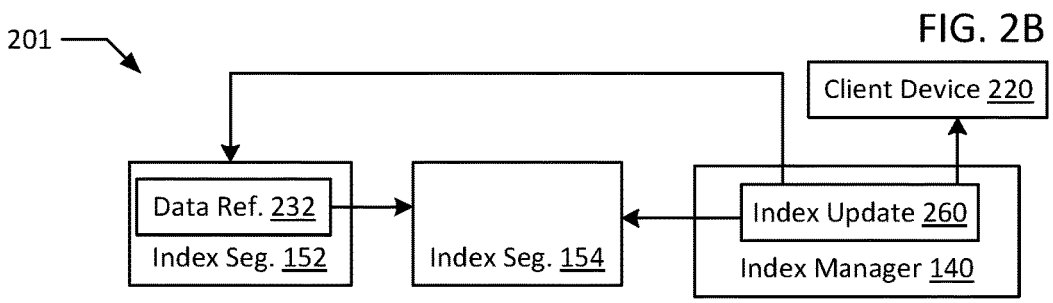
Figure 2C:
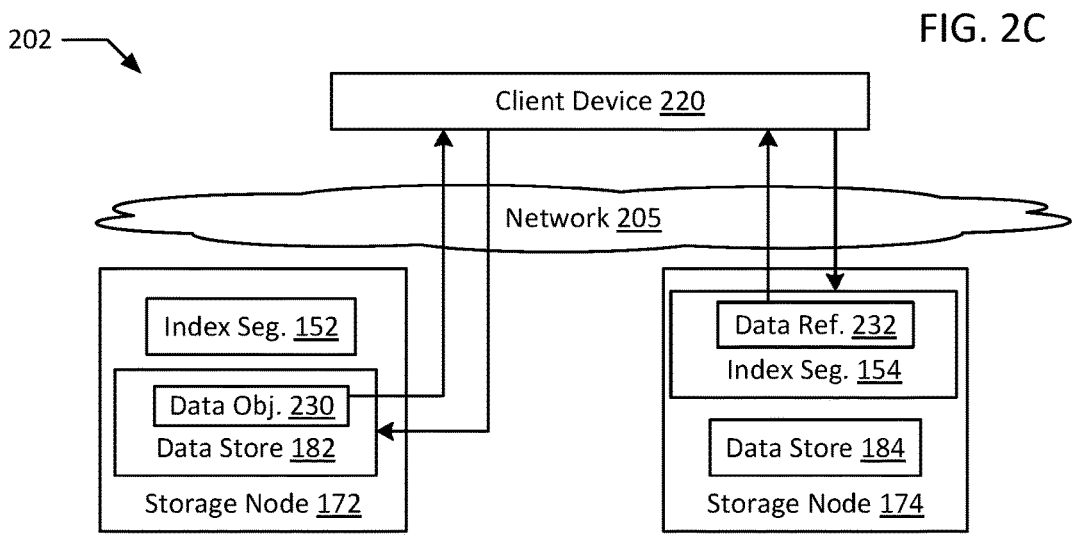

FIGS. 2A-C are block diagrams illustrating data storage and retrieval in a system employing efficient distributed indexing of data according to an example of the present disclosure. In an example, illustrated system 200 is an extension of system 100, additionally depicting a client device 220 accessing data stored in the distributed storage system of system 100 over a network 205. In an example, network 205 may be any form of suitable network for enabling communications between computing devices, for example, a public network (e.g., the Internet), a private network (e.g., a local area network (LAN) or wide area network (WAN)), or a combination thereof. In an example, client device 220 may be any form of network accessible device (e.g., phone, tablet, laptop, desktop, server, Internet of Things ("TOT") device, etc.) connected to system 200 through network 205. In an example, client device 220 may have its own processors, memories, I/Os, and/or OS similar to physical hosts 110A-B. In an example, client device 220 accessing system 200 may connect to a network facing component such as a network gateway, which may be associated with index manager 140. In the example, the network gateway or load balancer may route requests from client device 220 to appropriate storage nodes for handling the requests. In another example, index manager 140 may provide client device 220 with an index of index segments to allow client device 220 to make requests to an appropriate index segment. In an example, a Domain Name Server ("DNS") may resolve an internet address into an Internet Protocol ("IP") address for the associated network gateway, web portal, or load balancer. In an example, a user of client device 220 may log into an account to access services provided by the distributed storage system.

In the illustrated example of system 200 of FIG. 2A, client device 220 requests to store a data object 230 identified by a data reference 232 in the distributed storage system of system 100. In the example, based on a current index of indexes, client device 220 and/or index manager 140 determines that data reference 232 resides within a namespace range currently served by index segment 152. In the example, an entry is added to index segment 152 for data reference 232, the new entry referencing a storage location (e.g., memory page) in data store 182 that is available for storing data object 230. In the example, data object 230 is stored to data store 182. In an example, collocating a data object 230 (e.g., in data store 182) with the index segment 152 that includes data reference 232 to data object 230 may deliver performance advantages to data storage and retrieval by reducing the number of required network requests to retrieve data object 230. For example, when queried to retrieve data reference 232 in order to retrieve data object 230, index segment 152 may request data store 182 to respond to the request with data object 230. However, in the example, due, for example, to storage constraints and/or reindexing, data object 230 does not need to be stored in the same storage node 172 as data reference 232.

In illustrated system 201 depicted in FIG. 2B, index manager 140 triggers a reindexing of the distributed storage system. In the example, index manager 140 calculates an index update 260 that is sent to client device 230 and index segments 152 and 154. In some examples, rather than client device 230 performing lookups of appropriate index segments, index segment lookup may be performed by index manager 140, in which case the index update 260 is only accessed by client device 230 when it reconnects to index manager 140 to perform another data operation. In an example, due to index update 260, index segment 152 determines that a portion of the namespace of data objects previously indexed by index segment 152, including data reference 232, is now indexed by index segment 154. In the example, data object references including data reference 232 in the affected namespace segment are transferred to index segment 154. For example, data reference 232 may be associated with data object 230 named data123.dat. In the example, where index segment 152 originally (e.g., in system 200) included the namespace segment of caaza to daxxa, after index update 260 is received, the new namespace segment of index segment 152 may become cbbyb to daazy. In the example, data123.dat no longer falls within the new upper limit of daazy, and therefore data reference 232 is transferred to the subsequent index segment 154.

In illustrated system 202 depicted in FIG. 2C, client device 220 requests to retrieve data object 230 for a processing task. In the example, client device 220 recalculates a current index segment of data reference 232 based on index update 260 and determines that data reference 232 is now stored in index segment 154. In the example, data reference 232 is retrieved from index segment 154, and the location of data object 230 in data store 182 is retrieved from data reference 232. Data object 230 is then retrieved from data store 182. In the example, data objects (e.g., data object 230) are not transitioned along with their respective index segments, for example, due to network and/or storage overhead. In some examples, data objects may be lazily transitioned when computing resources are available to keep data objects substantially collocated with their respective data references albeit with a delay.

FIGS. 3A-D are graphs illustrating a distribution of clumpy data within a namespace and the partitioning of the namespace into segments for efficient distributed indexing of the clumpy data according to an example of the present disclosure. As discussed previously, while sharding an index based on hash values advantageously quickly allows for a roughly even distribution of object references to each index shard, it provides for significant disadvantages when querying for ranges of data objects since references to similarly named data objects will end up on very different index shards.

An alternative index sharding solution divides the namespace of allowed object names evenly rather than hashing the object names to generate even sized shards. To illustrate, in an example system, an object name may be limited to lower case letters. In the example the namespace of 5 letters forming a prefix to an object name may therefore be defined as "a" to "zzzzz". Since prefixes may be 1 to 5 characters long, there are 12,356,630 possible prefixes in the defined namespace. If this namespace were divided into 1,000 equal shards, the following may be a representative sampling of the shards:

| Shard | Range of Names |
|---|---|
| 1 | a-aarox |
| 2 | aaroy-abjdw |
| 3 | abjdx-acasv |
| . | . |
| . | . |
| . | . |
| 1000 | zzil-zzzzz |

This division based on namespace is a very fast operation since a system may be predefined with the set of allowable values in the namespace and therefore may quickly calculate the nth value of the namespace based on the combinations of allowable characters in the object names. Distributing index shards evenly across a namespace, however, often creates distributions that are not reflective of actual usage since users of these computer systems are typically human. Human beings typically don't name objects completely randomly, and therefore object names tend to include words or parts of words. For example, shard #3 in the example above would contain ablaze, able, aboard, about, abrade, abrupt, absent, absorb, abut, abuzz, abyss, and academy etc. But shard #1000 would contain no English words at all. Therefore, shard #3 may end up including thousands of times as many entries as shard #1000, which does not efficiently utilize storage space, network bandwidth, or processor cycles when the shards are queried. Because object naming schemes tend to generate clumpy distributions of names with a few disproportionately used ones.

An ideal division of labor between index segments may be implemented by taking the actual data object names stored in the system and then dividing the actual names by count. For example, a system storing a billion objects with one thousand index segments may have one million references in each index segment. There are downsides, however, to such a scheme. Specifically, the system may be required to be locked to changes while the index is calculated and recalculated to ensure index consistency. In addition, actually determining the specific reference names at each cutoff between index segments requires the entire universe of data object names to be sorted in a list. This is a significantly more expensive calculation than a namespace based sharding scheme or a hash based sharding scheme. Because such an index has fairly arbitrary cutoffs, to adequately communicate the index to users, each cut off point between index segments needs to be sent to each client device accessing the data, which may start adding up to a substantial amount of data, and thus a substantial additional network transmission overhead both from a latency and a bandwidth perspective. In an example, an alphanumeric index of transition points between various index shards may be tens of megabytes in size, and may be in a format with limited compressibility (e.g., few repeated elements). In the example, network transmission of the index of indexes itself may take even more time than an actual index query.

In illustrated systems 300-303 in FIGS. 3A-D, a combination of sharding schemes is implemented to account for the dumpiness of human generated object names while still providing for a quickly calculated index that is able to be communicated in a compact form (e.g., a mathematical formula). For example, example system 300 depicts a scatterplot of data object names (e.g., data references 330-335) along a namespace axis 310 representing the universe of allowable object names in the system. In the example, the namespace of namespace axis 310 is divided into a plurality of temporary partitions 320-325. In an example, these temporary partitions may be divided equally based on namespace axis 310. For example, each of temporary partitions 320-325 may represent a substantially equal number of allowed prefixes for object names. In an example, the number of partitions (e.g., temporary partitions 320-325) and the number of characters in the evaluated prefixes of namespace axis 310 may be configured to expose more or less granularity for the distribution of data references 330-335. In an example, reindexing may utilize alternative temporary partitioning schemes as discussed below. In the illustrated example, temporary partition 320 includes one data reference 330, temporary partition 321 includes five data references 331, temporary partition 322 includes one data reference 332, temporary partition 323 includes six data references 332 and 333, temporary partition 324 includes five data references 333, and temporary partition 325 includes three data references 334 and 335.

Figure 3A:
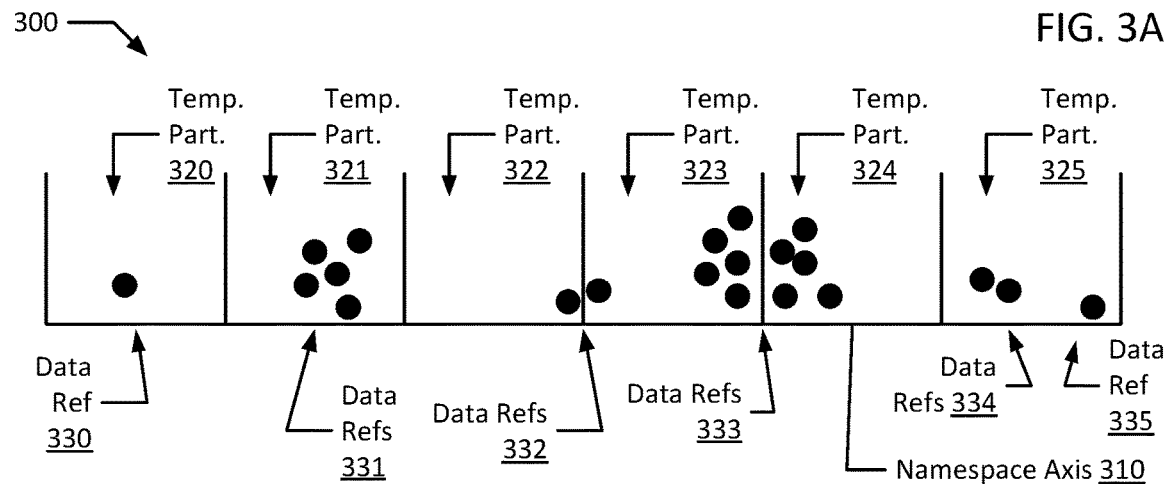
FIGS. 3A-D are graphs illustrating a distribution of clumpy data within a namespace and the partitioning of the namespace into segments for efficient distributed indexing of the clumpy data according to an example of the present disclosure.
Figure 3B:
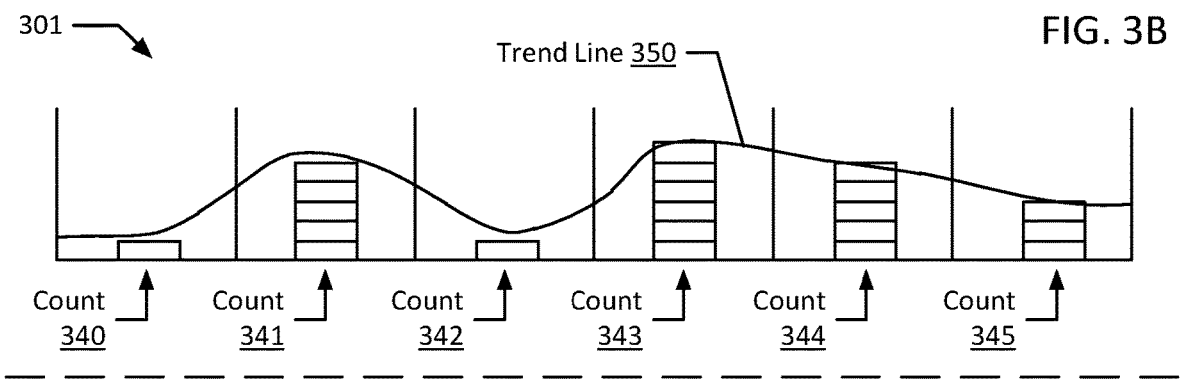

In illustrated system 301 in FIG. 3B, the quantity of data references in each temporary partition (e.g., temporary partitions 320-325) of system 300 is tabulated as a respective count (e.g., counts 340-345). In the example, these respective counts 340-345 may also be plotted on the namespace axis 310 representing, with a respective loss of granularity, a general population density of object names in each of temporary partitions 320-325. For example, count 340 is one, count 341 is five, count 342 is one, count 343 is six, count 344 is five and count 345 is three. In an example, each count (e.g., counts 340-345) represents a single estimated data point averaging of all of the data references in a given temporary partition. In an example, trend line 350 is a trend line of the respective counts of data references of each of temporary partitions 320-325 plotted against frequency (e.g., counts 340-345) and namespace axis 310. In an example, trend line 350 may be represented by a mathematical formula, typically in the form of a sinusoidal or polynomial function since the distribution of object names is typically clumpy with peaks and valleys through the namespace represented by the namespace axis 310.

In typical object name distributions, the Discrete Fourier Series may be used to generate a trend line that approximates the distribution of data references represented by counts 340-345. For example, a typical trend line may be represented by the general formula for a given data point x:

$$F_1(x) = a_0 + a_1 \cos(x) + b_1 \sin(x) + a_2 \cos(2x) + b_2 \sin(2x) + a_3 \cos(3x) + b_3 \sin(3x) + \ldots$$

In the example, the Discrete Fourier Series represents a compromise between calculation speed and accuracy of tracking peaks in a typical object name distribution that may advantageously generate a trend line in examples of the current disclosure but any formula generating a trend line that fits the data points may be implemented. In the example, for each peak in the distribution of data reference counts, an additional term may be necessary in the trend line formula to accurately track the distribution, and therefore a granularity of the number of temporary partitions taken may affect a complexity of the trend line formula. A balance may be struck between accuracy and speed by adjusting the number of temporary partitions 320-325.

Figure 3C:
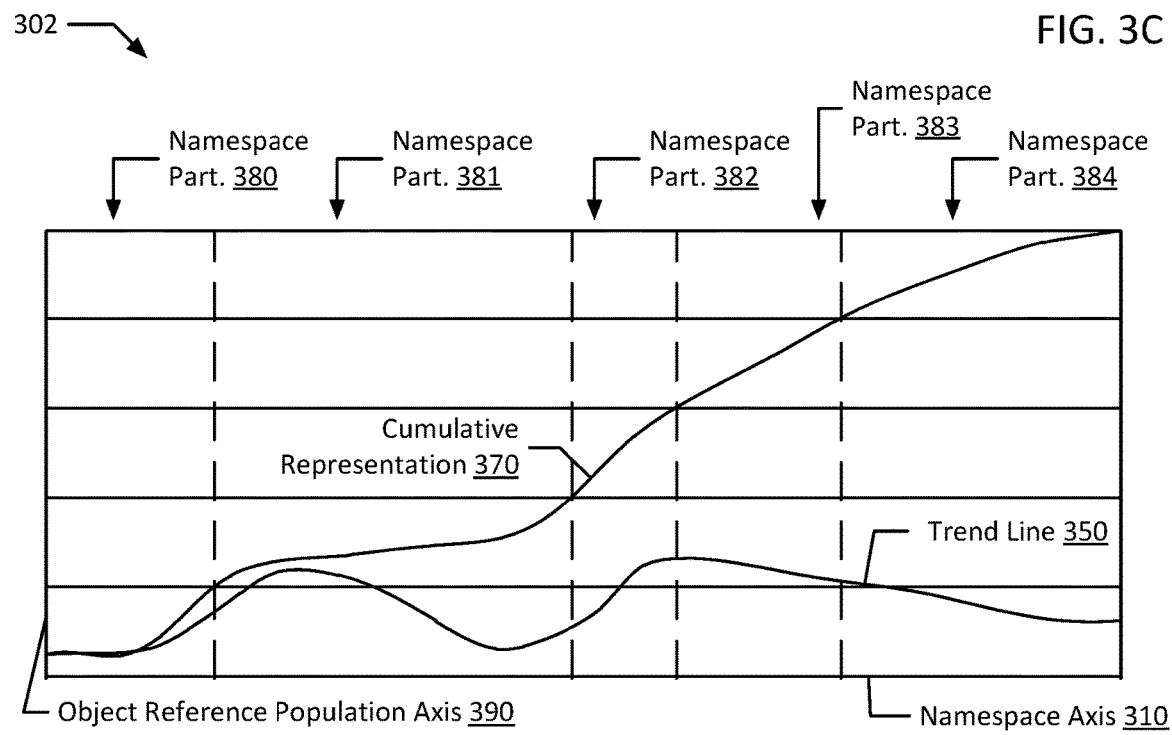

Illustrated example system 302 in FIG. 3C is a graph illustrating the conversion of trend line 350 to a plurality of namespace partitions 380-384 associated with the final namespace bands retained in each index segment of a distributed index. In an example, trend line 350 may be integrated to determine an estimated cumulative representation 370 of the total object reference population at any given point in the namespace represented by namespace axis 310. For example, during peaks in trend line 350, the cumulative representation 370 as a proportion of the total object reference population represented by object reference population axis 390 also rises quickly, while during valleys in trend line 350, the cumulative representation 370 rises slowly. By dividing the object reference population axis 390 into equal segments and determining where these segments intersect cumulative representation 370, name space partitions 380-384 may be determined, with each of name space partitions 380-384 representing a similar count of object references but a different sized segment of the total namespace universe. Therefore clumps of data references (e.g., data references 331 or 333) are generally kept within the same namespace partition (e.g., namespace partitions 381 and 383) which provides synergistic benefits when those data references are accessed together, since only one index segment needs to be queried. The granularity of temporary partitions 320-325 therefore affects how accurately the final namespace partitions 380-384 tracks the actual distribution of object names.

In the Discrete Fourier Series example above, an integral of the trend line may be represented by a formula such as:

$$F_2(x) = \int F_1(x) dx$$
$$= \int \left( a_0 + a_1 \cos(x) + b_1 \sin(x) + a_2 \cos(2x) + b_2 \sin(2x) + a_3 \cos(3x) + b_3 \sin(3x) + \ldots \right) dx$$
$$= a_0 x + a_1 \sin(x) - b_1 \cos(x) + \frac{a_2}{2} \sin(2x) - \frac{b_2}{2} \cos(2x) + \frac{a_3}{3} \sin(3x) - \frac{b_3}{3} \cos(3x) + \ldots + C$$

In an example, C may be an offset constant represented by the midpoint of the first bucket with a data object (e.g., temporary partition 320 with a count 340 of one). In an example, for a given value x on the namespace axis 310 (e.g., a numerical value of a given alphanumerical prefix in the universe of allowable object name prefixes in the namespace), a series of coefficients a and b may be identified to conform a trend line 350 to the counts 340-345 of data references 330-335. Intersection points (e.g., dividing points between namespace partitions 380-384) of a respective cumulative representation 370 in such an example may therefore be calculated based on a formula such as:

$$F_3(x) = F_2(x')\big|_c^x$$
$$= F_2(x) - F_2(c)$$
$$= a_0 x + a_1 \sin(x) - b_1 \cos(x) + \frac{a_2}{2} \sin(2x) - \frac{b_2}{2} \cos(2x) + \frac{a_3}{3} \sin(3x) - \frac{b_3}{3} \cos(3x) + \ldots - F_2(c)$$

In an example, the graph of FIG. 3C is a simulated graphical representation of F3(x) above. In the example system where the Discrete Fourier Series is implemented to compute trend line 350, determining which namespace partition (e.g., of namespace partitions 380-384) a given object name corresponds to, and therefore which index segment to access for a given data object reference, is computed as a function of F3(x), for example where P is the number of namespace partitions 380-384 and M is the maximum value of the y axis (e.g., object reference population axis 390):

$$F_4(x) = \left\lfloor \frac{F_3(x) \cdot P}{M} \right\rfloor$$

Figure 3D:
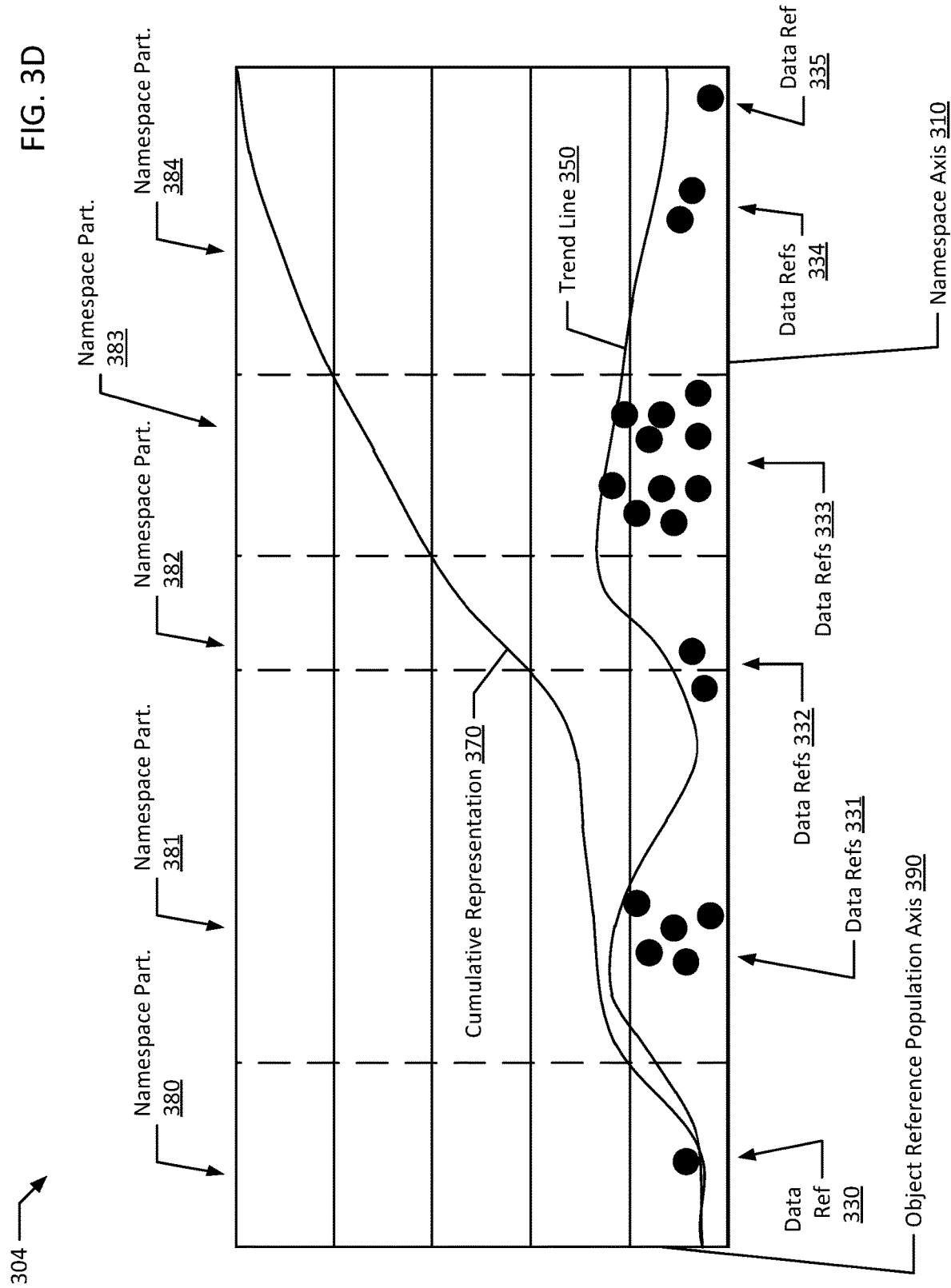

Illustrated system 304 in FIG. 3D overlays the data references 330-335 on top of the graph of FIG. 3C. As seen in FIG. 3D, by implementing efficient distributed indexing of clumpy data, each "clump" of data references generally ends up being partitioned to its own respective separate namespace partition (e.g., namespace partitions 380-384), or spread over a minimal number of partitions, for example, in the case of very large clumps of data references. Therefore even though namespace partition 383 ends up with a disproportionate number of entries, the access rate to each namespace partition is likely well distributed. For example, the data references 333 may all belong to a single user with a uniform naming scheme and therefore are likely to be accessed together, but other users are therefore unlikely to access namespace partition 383. In the illustrated example, data references 332 end up on two separate namespace partitions 381 and 382. While this is likely suboptimal from an access perspective, the dividing point of namespace 382 is illustrative of how variating the number of temporary partitions and/or namespace partitions may affect these types of edge cases. For example, if there are six namespace partitions rather than five (e.g., namespace partitions 380-384), both data references of data refs 332 may likely end up on the same namespace partition. However, in that case, data references 333 may likely be split between two different namespace partitions.

The goal, however, is not perfect sharding, rather performance efficiency is found by implementing a sharding scheme that is sufficiently accurate while being fast enough to calculate to be implemented and updated regularly. For example, finding a perfect sharding scheme where each group of data references 330-335 is on a separate namespace partition may be an inefficient use of resources (e.g., requiring significantly higher granularity of temporary partitions 320-325 and accuracy of trend line 350). In an example, the negative effect of separating data references 332 may be significantly trumped by the positive effects of collocating data references 333 on one namespace partition for efficiency purposes. In an example, multiple namespace partitions may be combined in one index segment (e.g., twice as many namespace partitions are generated as index segments). In an example, a given namespace partition and/or index segment may be replicated across multiple nodes for redundancy and enhanced access bandwidth (e.g., with data locks implemented between nodes for updates).

In an example, if index manager 140 determines that the index segments 152, 154, 156, and 158 require reindexing, index manager 140 may initiate a de novo temporary partitioning of the namespace. In the example, current index segments may be queried for the counts of data references in each new temporary partition. In an example, temporary partitioning may be implemented with any fast and efficient method of partitioning a given namespace. For example, especially in cases where change in object reference name distribution is more limited, temporary partitioning may be implemented by directly importing the previous namespace partitions. For example, each of the index segments storing namespace partitions 380-384 may be queried for a respective count of the data objects in the respective namespace partitions (e.g., one in namespace partition 380, six in namespace partition 381, one in namespace partition 382, ten in namespace partition 383, and three in namespace partition 384). In the example, a new trend line may be fit to the new temporary partitions and then integrated for a new index. In the example, the namespace midpoint of each of the temporary partitions along namespace axis 310 may be used for plotting the count of the temporary partitions so these temporary partitions need not be completely equal in size on the namespace axis 310. However, in an example, a change in granularity (e.g., to capture new peaks or clumps of object names) may require repartitioning based on namespace.

In an example, repartitioning based on generating temporary partitions with equal counts of data object references may also be efficiently performed after an index is initially sharded as described above. For example, assuming results are not required to be perfect, each index segment may be queried for a current population count by index manager 140. Since there is a sequential order to each index segment, index manager 140 may determine namespace partition points for each equal temporary partition by querying the respective index segments for their nth record, where n is a dividing point between two temporary partitions in the namespace. Sorting and retrieving such records, when performed in parallel by numerous index segments, is a significantly smaller bottleneck than conducting such a survey on a unified index, and each index segment presents a significantly smaller number of records to be searched and sorted. If these points are plotted on an object reference population axis 390 and namespace axis 310, the resulting trend line between the points is effectively already an integrated cumulative representation. This new trend line may then be directly implemented as a formula of the new index. In an example, changes to the data in the system need not be locked during such reindexing because the results do not need to be perfectly accurate so slightly stale data (e.g., from a snapshot) may be used. In an example, an index segment 152 may store 100,000 records, and but 10 new records may be added between when index segment 152 was queried for its current record population count and when it was queried for its current 19,478th entry. In the example, the current 19,478th entry may be the previous 19,476th entry but the two entries may likely still represent a same first five or six characters in the allowable namespace, so therefore the new additions may be inconsequential for reindexing purposes. In an example, the more records there are in each index segment, the less efficient it becomes to reindex with temporary partitions of substantially equal counts of records.

Figure 4:
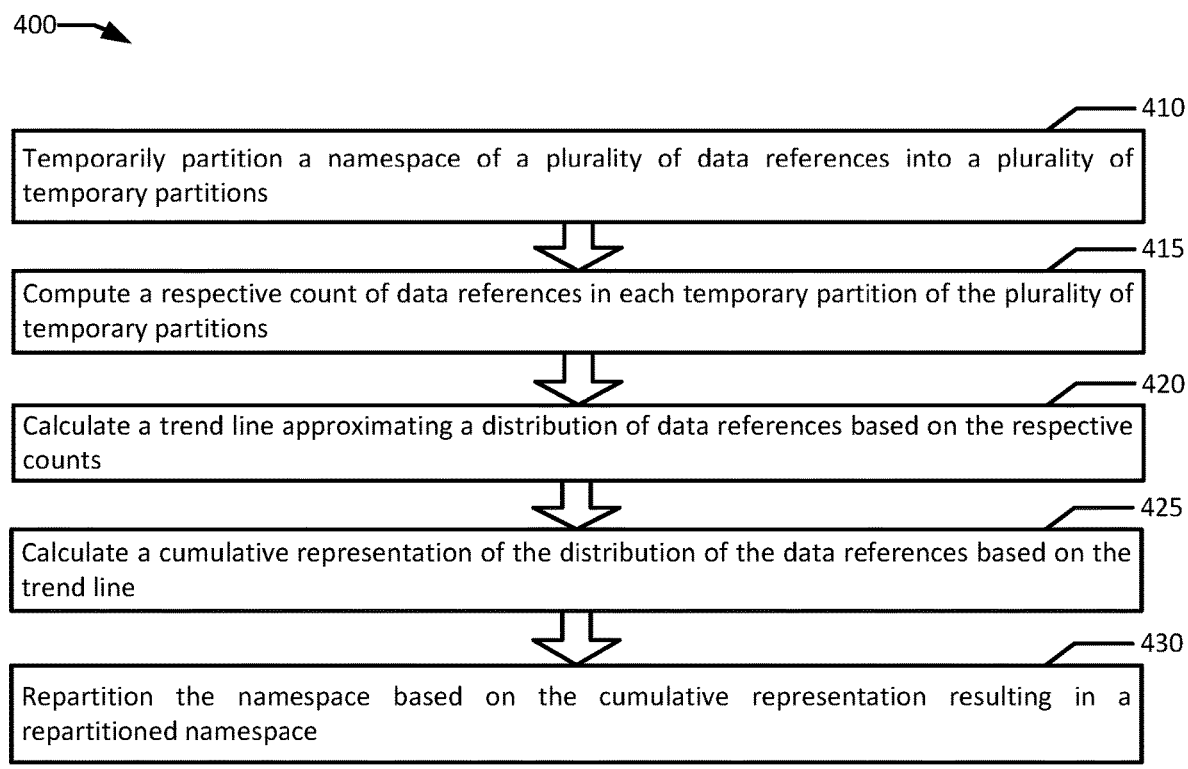
FIG. 4 is flowchart illustrating an example of efficient distributed indexing of data according to an example of the present disclosure.

FIG. 4 is flowchart illustrating an example of efficient distributed indexing of clumpy data according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by an index manager 140.

Example method 400 may begin with temporarily partitioning a namespace of a plurality of data references into a plurality of temporary partitions (block 410). In an example, data stores 182, 184, 186, and 188 are distributed across a plurality of storage nodes (e.g., storage nodes 172, 174, 176, and 178). In an example, index segments (e.g., index segments 152, 154, 156, and 158) of a distributed index of data references to the data objects stored in the distributed storage system are also distributed across storage nodes 172, 174, 176, and 178. In an example, an index segment (e.g., index segments 152, 154, 156, or 158), part of an index segment, a data store (e.g., data stores 182, 184, 186, or 188) or part of a data store may be replicated across two or more storage nodes (e.g., storage nodes 172, 174, 176, and 178) such that the failure or loss of any storage node (e.g., one of storage nodes 172, 174, 176, and 178) does not affect the integrity of the distributed index or the distributed storage system as a whole. For example, index segment 152 may additionally be hosted in a separate container executing on VM 166A for redundancy purposes. In such an implementation, reads from index segment 152 or its clone may not require the index segment to be locked to changes, but writes to the index segment 152 (e.g., to store or update a data object) may require both copies to be locked before execution. In an example, the distributed index of index segments 152, 154, 156, and 158 is periodically regenerated, for example, by index manager 140. In an example, a plurality of data references change index segments after the distributed index is regenerated.

In an example, index manager 140 divides a namespace of data objects stored in a distributed storage system with a plurality of data stores (e.g., data stores 182, 184, 186, and 188) into a plurality of temporary partitions (e.g., temporary partitions 320-325). In the example, a namespace of the data objects in data stores 182, 184, 186, and 188 includes all of the allowed object names in the system based on the system's object naming configurations. In an example, a namespace may be divided into substantially equal sized temporary partitions since the possible starting combinations of characters in an object name is predictable. For example, if objects are allowed to start with any capital or lower case character or any number digit 0-9, then the first digit may be any of 64 characters (e.g., 26 characters a-z, 26 characters A-Z, 10 characters 0-9). In such a system, at a granularity of one character, 64 equal sized partitions may be generated. However, to generate 50 partitions, some partitions may include two possible characters and others include one possible character. In an example, the more temporary partitions a namespace is divided into, the more accurate the resulting partitioned index will be in reflecting the dumpiness of the underlying data. In the above example, at two characters, there will be 64×65=4,160 possibilities (accounting for a null second character due to one character names). In an example, a number of leading characters in object names to use to generate temporary partitions may depend on the desired granularity of the temporary partitions.

A respective count of data references in each temporary partition of the plurality of temporary partitions is computed (block 415). In an example, index manager 140 determines a count of the number of data object references in the distributed index that fall into each of the temporary partition buckets. For example, for temporary partitions 320-325, counts 340-345 reflect the respective counts of data references 330-335 that fall into each of the temporary partition buckets.

A trend line approximating a distribution of data references based on the respective counts is calculated (block 420). In an example, index manager 140 computes a trend line to fit counts 340-345 of data references 330-335. In an example, index manager employs a Discrete Fourier Series computation to determine the trend line 350. In an example, each peak in a Discrete Fourier Series corresponds to an additional term, with a corresponding additional coefficient, in the respective Discrete Fourier Series formula. In the example, additional terms may increase the complexity and computational overhead of an index of index segments employing such a formula, but insufficient terms may fail to capture the clumpiness of the underlying data set (e.g., the peaks in the counts of data references per temporary partition). In an example, the number of peaks, and therefore coefficients and terms in a given index's formula may be determined based on the temporary partitioning of the namespace. For example, statistical analysis may be implemented to determine a significant size for a peak, or a set percentage of the total object name population may determine a peak. In illustrated system 301, it may be determined that there are two peaks corresponding to temporary partition 321 and temporary partition 323 respectively. In the example, temporary partitions 324 and 325 are not peaks because they decrease in count from temporary partition 323 without any subsequent increase. In an example, index manager 140 uses a look-up table to determine sine and/or cosine values in conjunction with calculating the trend line 350 (e.g., as part of a Discrete Fourier Series computation). In some cases, other functions may more closely approximate an object name distribution (e.g., a polynomial function or other sinusoidal function).

A cumulative representation of the distribution of the respective counts based on the trend line is calculated (block 425). In an example, cumulative representation 370 is calculated based on trend line 350 by integrating trend line 350. In an example, trend line 350 smooths out the actual clumpiness of the underlying data, in essence performing a form of lossy compression on the actual distribution of object names to make the index of indexes more transportable and light weight. In an example, calculating the cumulative representation 370 includes determining at least one sine or cosine value via look-up table. In an example, the formula of cumulative representation 370, trend line 350, and/or a derivative of cumulative representation 370 is transferred to index segments and/or client devices as a representation of an index of the index segments. In the examples, with the respective formulas, a client device may calculate the index segment of a given object name.

The namespace is repartitioned based on the cumulative representation resulting in a repartitioned namespace (block 430). In an example, a distributed index of the plurality of data references is divided into index segments based on the repartitioned namespace. Cumulative representation 370 is then calculated to realign the smoothed curve of trend line 350 to extrapolate efficient break points between the name spaces governed by each index segment in the distributed index. In an example, cumulative representation 370 is divided into substantially equal segments on the object reference population axis 390, and where those segments intersect with cumulative representation 370 the respective namespace partition (e.g., namespace partitions 380-384) may be determined by referencing the namespace axis 310. In an example, the graphical representations of FIGS. 3A-D are for illustrative purposes only, and index manager 340 may perform the computations illustrated without displaying any results in graphical form. In an example, an index of index segments 152, 154, 156, and 158 is communicated as a formula of cumulative representation 370, or a derivative formula thereof. In an example, the index of index segments may be calculated with a known formula (e.g., Discrete Fourier Series) and a series of coefficients to feed into the formula. In an example, the index formula includes an offset constant representing the start of the initial index segment (e.g., $F_2(C)$ above).

In an example, the index of index segments (e.g., formula of cumulative representation 370) is transmitted to a client device 220 and the client device 220 retrieves a data object (e.g., data123.dat) by computing a index segment of the data object with the object name and the index formula, and querying the appropriate index segment (e.g., index segment 154) for the location of the data object. In an example, client device 220 stores a new data object by computing that the new data object's name (e.g., data1234.dat) belongs in the same index segment 154 as data123.dat and inserting a reference to data1234.dat into index segment 154 referencing a storage location of data1234.dat.

Figure 5:
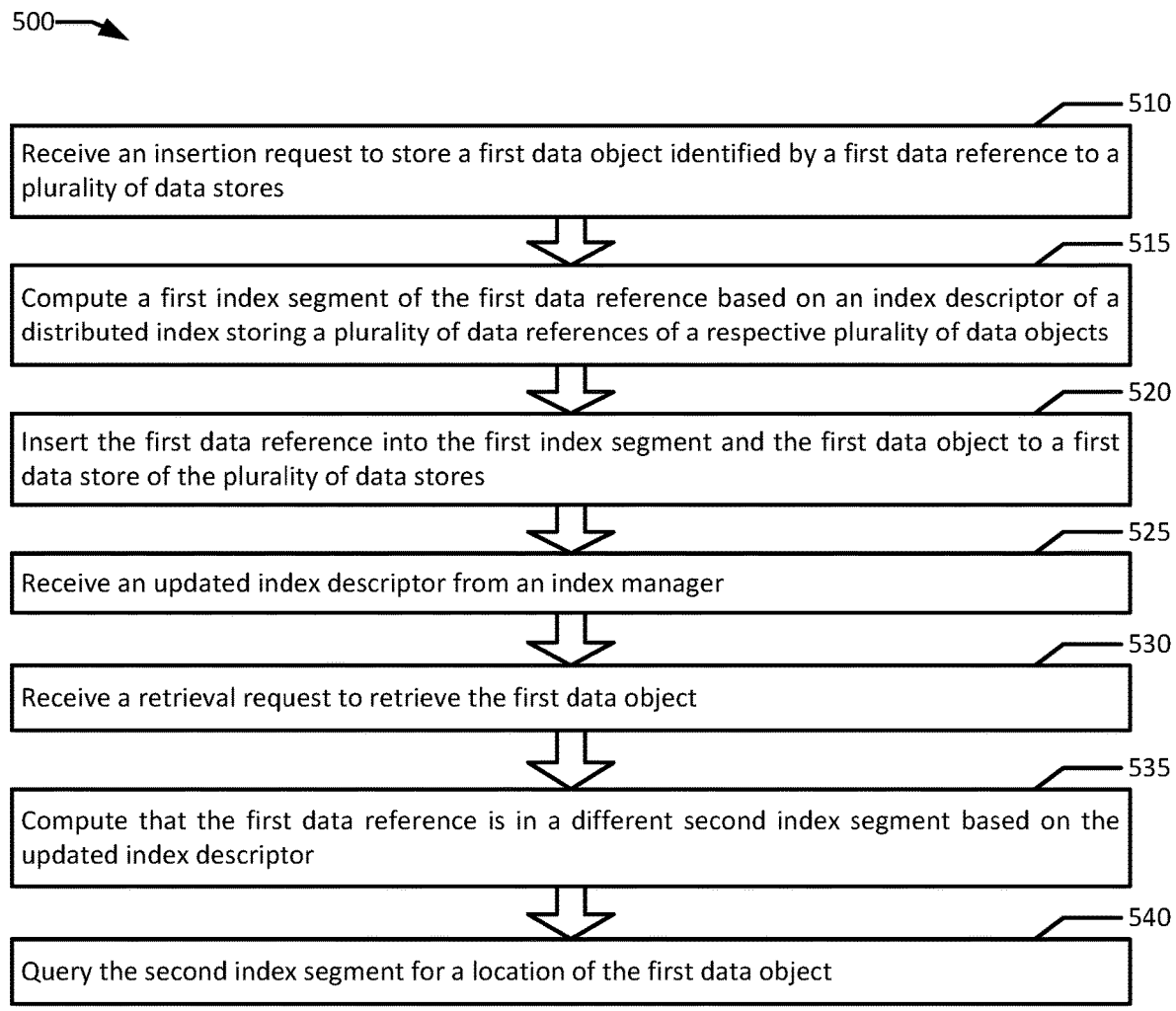
FIG. 5 is flowchart illustrating an example of data storage and retrieval in a system employing efficient distributed indexing of data according to an example of the present disclosure.

FIG. 5 is flowchart illustrating an example of data storage and retrieval in a system employing efficient distributed indexing of data according to an example of the present disclosure. Although the example method 300 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example, the method 400 is performed by a client device 220.

Example method 500 may begin with receiving an insertion request to store a data object identified by a data reference to a plurality of data stores (block 510). For example, client device 220 may receive a request to store data object 230 associated with data reference 232 (e.g., data123.dat) into a distributed storage system. A first index segment of the data reference is computed based on an index descriptor of a distributed index storing a plurality of data references of a respective plurality of data objects (block 515). In an example, client device 220 computes that index segment 152 is the appropriate index segment to store data reference 232 based on an index of index segments, for example, sent to client device 220 upon connecting to a storage gateway. In an example, rather than a list of break points between index segments in a namespace, the index descriptor is a formula and/or associated coefficients for calculating the index segment of a given object name. In an example, the index descriptor may be associated with a list of network addresses of index segments. In another example, the client device 220 requests a given index segment by identifier and is connected to the index segment by a storage gateway. In an example, index manager 140 is implemented on the storage gateway. The data reference is inserted into the first index segment and the data object to a data store of the plurality of data stores (block 520). In an example, client device 220 stores the data reference 232 to index segment 152 and data object 230 to data store 182.

An updated index descriptor is received from an index manager (block 525). In an example, the index manager 140 may generate the updated index descriptor with any of the methods described herein. In an example, index manager 140 determines based on an elapsed time, a count of data changes, or an index update request that the index of index segments requires regeneration. In an example, a given index segment may exceed a threshold size and request index regeneration. In an example, index regeneration to generate an updated index descriptor includes temporarily partitioning a namespace of the plurality of data references 330-335 into a plurality of temporary partitions 320-325, computing a respective count 340-345 of data references 330-335 in each temporary partition 320-325, calculating a trend line 350 approximating a distribution of data references 330-335 based on the respective counts 340-345, calculating a cumulative representation 370 of the distribution of the respective data references 330-335 based on the trend line 350, and repartitioning the namespace based on the cumulative representation 370 resulting in a repartitioned namespace, where the distributed index is divided into index segments based on the repartitioned namespace. In an example, index manager 140 sends the index update 260 to client device 220 along with index segments 152 and 154. In an example, data reference 232 is moved from index segment 152 to index segment 154 based on index update 260.

A retrieval request is received to retrieve the data object (block 530). For example, a user of client device 220 may request to modify data123.dat and client device 220 may send a retrieval request for data123.dat through the distributed storage system's network gateway. The first data reference is computed to be in a different second index segment based on the updated index descriptor (block 535). In an example, client device 220 and/or the distributed storage system's network gateway computes that data reference 232 to data123.dat has been moved to a different index segment 154 on a different storage node 174 and different host (e.g., container 164) from index segment 152.

The second index segment is queried for a location of the data object (block 540). In an example, index segment 154 is queried by client device 220 for the storage location of data object 230. In an example, data object 230 is stored on the same storage node 172 as index segment 152. In another example, data object 230 is stored on a different storage node from index segment 152 and also a different storage node from index segment 154. In various examples, index segments may be implemented independently of storage nodes and/or data stores. For example, index segments and the distributed index may be implemented in stand alone index containers that are scalable to the needs of the distributed storage system. In an example, client device 220 later requests storage of another data object related to data object 230 (e.g., data1234.dat). In the example, data123.dat and data1234.dat are computed to both belong in index segment 154 based on the updated index descriptor. In an example, the new object reference for data1234.dat is inserted in index segment 154 and the data object data1234.dat is stored in data store 184.

In an example, client device 220 requests retrieval of all data objects that start with the name data1 (e.g., data1.*). In the example, both data123.dat and data1234.dat are returned as results from index segment 154 to the query. In an example, index segment 154 is responsible for indexing data object references from daazy to dzzzx. In the example, only index segment 154 is queried for both the location of data123.dat and data1234.dat. In an example, rather than the copy of index segment 154 on storage node 174 responding to client device 220's request, a second instance of index segment 154 responds to the request. For example, a storage gateway redirects client device 220's query to a replicated instance of index segment 154 (e.g., hosted on a separate isolated guest).

Figure 6:
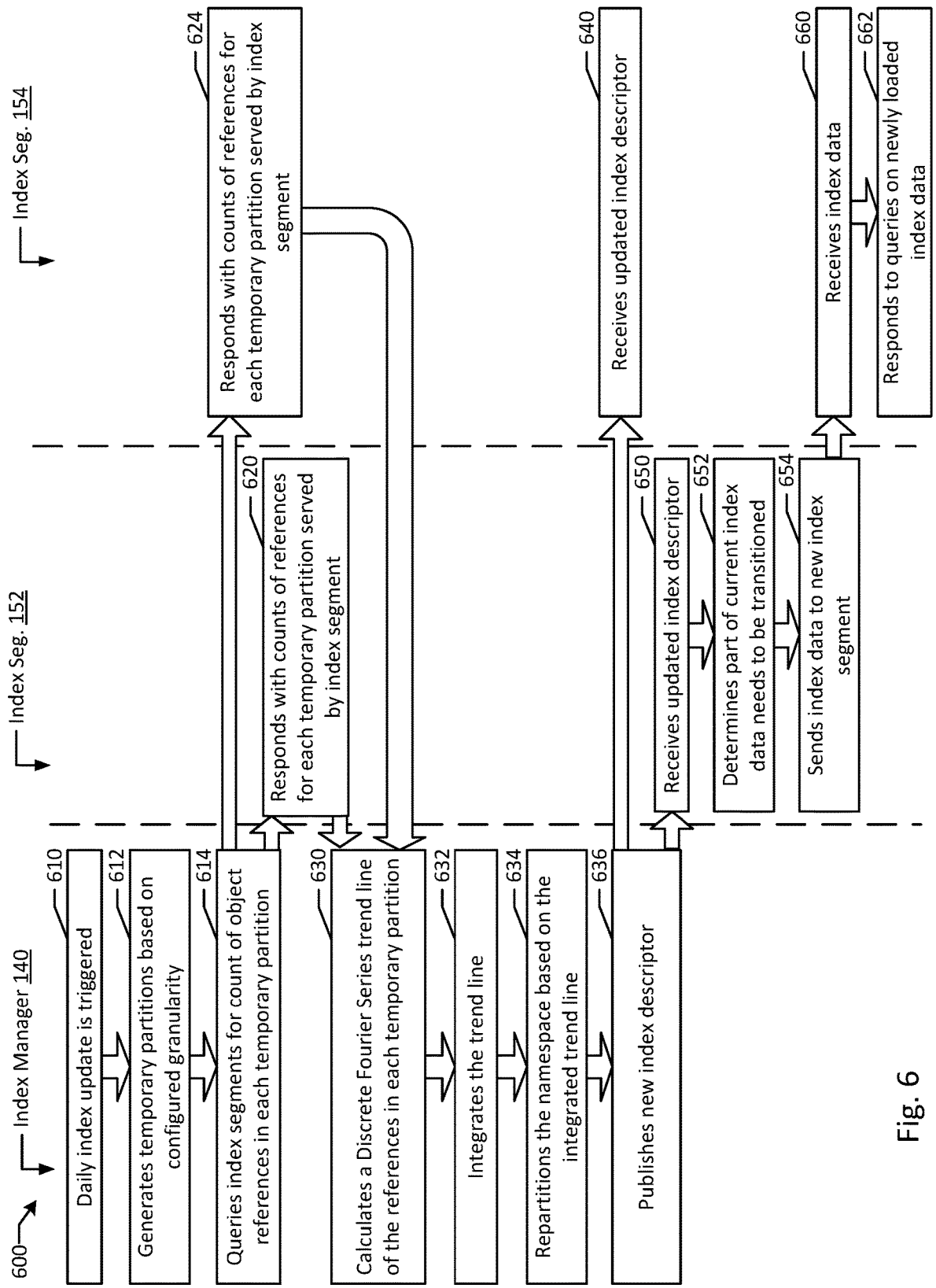
FIG. 6 is a flow diagram of an example of efficient distributed indexing of clumpy data according to an example of the present disclosure.

FIG. 6 is a flow diagram of an example of efficient distributed indexing of clumpy data according to an example of the present disclosure. Although the examples below are described with reference to the flow diagram illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, index manager 140 executes to repartition index segments 152 and 154 of a distributed index.

In example system 600, index manager 140 begins a daily index update (block 610). In the example, index manager 140 generates temporary partitions 320-325 based on a configured granularity of generating six temporary partitions to evenly divide up a namespace of namespace axis 310 (block 612). In the example, index manager 140 queries each current index segment (e.g., index segments 152, 154, 156, and 158) for a count of the number of object references in each of temporary partitions 320-325 (block 614). In an example, index segment 152 responds with a count of the references in temporary partition 320 and a partial count of the references in temporary partition 321 based on index segment 152's area of responsibility in indexing the namespace (block 620). In an example, index segment 154 responds with a partial count of the references in temporary partition 321, a count of the references in temporary partition 322 and a partial count of the references in temporary partition 323 based on index segment 152's area of responsibility in indexing the namespace (block 624).

In an example, index manager 140 calculates a Discrete Fourier Series trend line 350 of the references in each of temporary partitions 320-325 (block 630). In various examples, any computational formula may be substituted in generating trend line 350 that adequately captures the clumpiness of the underlying data reference names. In an example, index manager 140 integrates trend line 350 to generate cumulative representation 370 (block 632). In the example, index manager repartitions the namespace of the distributed storage system based on cumulative representation 370 (block 634). In an example, index manager 140 publishes a new index descriptor (e.g., new index formula, coefficients, and constants) to the various index segments, storage gateways, and/or end user devices (block 636). In an example, index segment 154 receives the updated index descriptor (block 640). In an example, index segment 152 also receives the newly updated index descriptor (block 650). In the example, index segment 152 determines that part of the current index data in index segment 152 needs to be transitioned based on the index update (block 652). In the example, index segment 152 sends the index data to be transitioned to index segment 154 (block 654). In an example, the index data being transitioned is backed up before being transferred. In an example, index segment 154 receives the index data from index segment 152 (block 660). In an example, index segment 154 responds to queries based on the index data loaded from index segment 152 as part of the daily reindexing (block 662).

Figure 7:
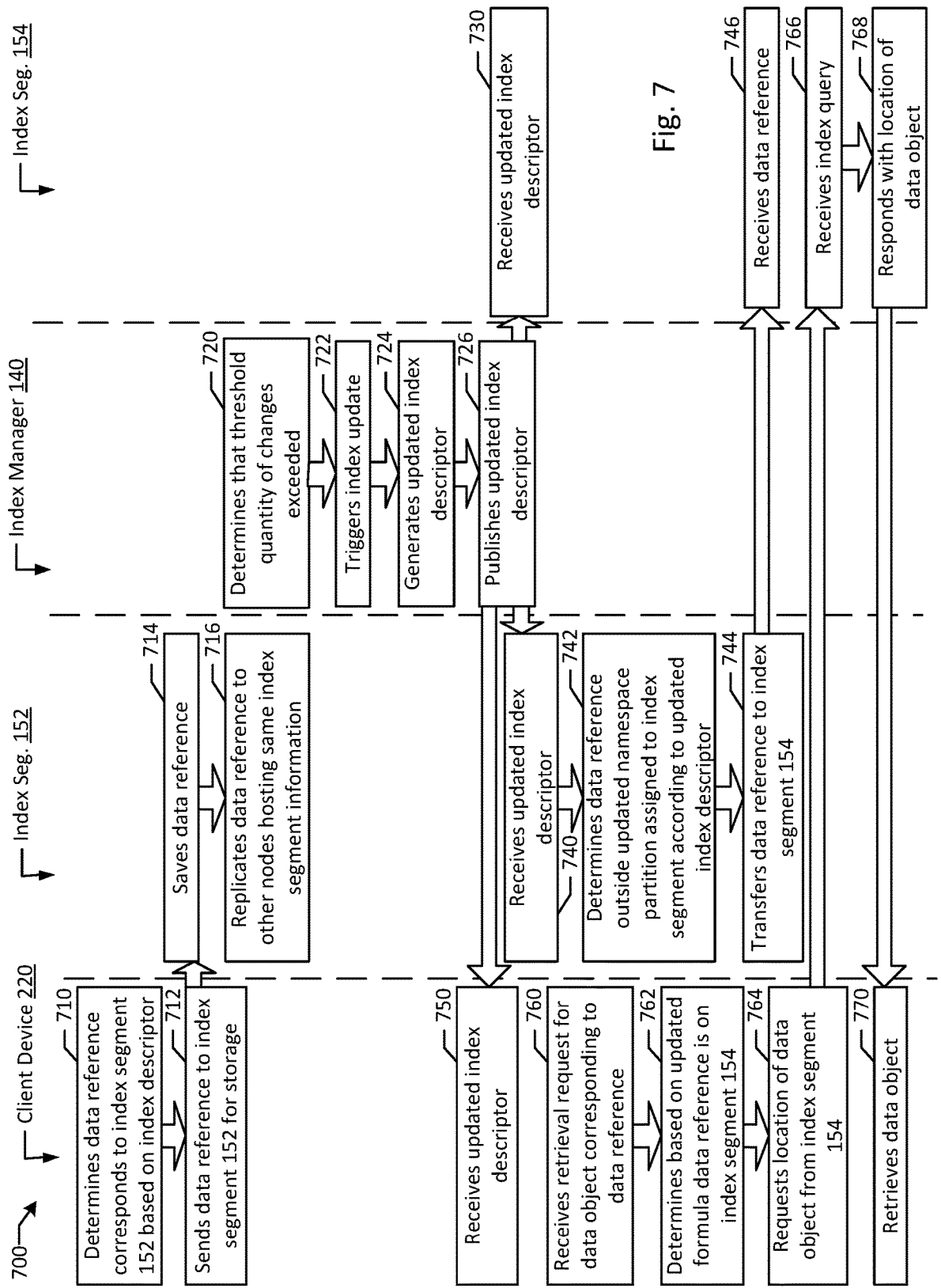
FIG. 7 is a flow diagram of an example of data storage and retrieval in a system employing efficient distributed indexing of data according to an example of the present disclosure.

FIG. 7 is a flow diagram of an example of data storage and retrieval in a system employing efficient distributed indexing of data according to an example of the present disclosure. Although the examples below are described with reference to the flow diagram illustrated in FIG. 7, it will be appreciated that many other methods of performing the acts associated with FIG. 7 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 700, client device 220 stores and retrieves data in a distributed storage system managed by index manager 140, the distributed storage system including a distributed index with index segments 152 and 154.

In example system 700, client device 220 determines that data reference 232 corresponds to index segment 152 based on an index descriptor (block 710). In various examples, the index descriptor may be stored on client device 220 or on any intermediary communication layer between client device 220 and index segment 152. In an example, client device 220 sends data reference 232 to index segment 152 for storage (block 712). In an example, index segment 152 saves data reference 232 (block 714). In an example, index segment 152 replicates data reference 232 to other nodes in system 100 hosting replicated copies of index segment 152 (block 716).

In an example, index manager 140 determines that a threshold quantity of data changes in system 100 has been exceeded, for example, one hundred thousand data objects have been added and/or modified (block 720). In an example, index manager 140 triggers an index update of the distributed storage system (block 722). In an example, index manager 140 generates an updated index descriptor (e.g., new index formula, coefficients, and/or constants) (block 724). In an example, index manager 140 publishes the updated index descriptor (e.g., index update 260) to index segments 152, 154 and client device 220 (block 726). In an example, index segment 154 receives the index update 260 (block 730). In an example, index segment 152 also receives index update 260 (block 740). In the example, index segment 152 determines that data reference 232 is outside of the namespace partition now associated with index segment 152 based on index update 260 (block 742). In the example, index segment 152 transfers data reference 232 to index segment 154 (block 744). Index segment 154 receives data reference 232 (block 746).

In an example, client device 220 also receives index update 260 (block 750). In an example, client device 220 receives a retrieval request for data object 230 corresponding to data reference 232 (block 760). In the example, client device 220 determines, based on index update 260, that data reference 232 is now on index segment 154 (block 762). In the example, client device 220 requests the location of data object 230 from index segment 154 (block 764). In the example, index segment 154 receives the index query from client device 220 (block 766). The index segment 154 responds to client device 220 with the location of data object 230 (block 768). Client device 220 retrieves data object 230 for modification (block 770).

Figure 8:
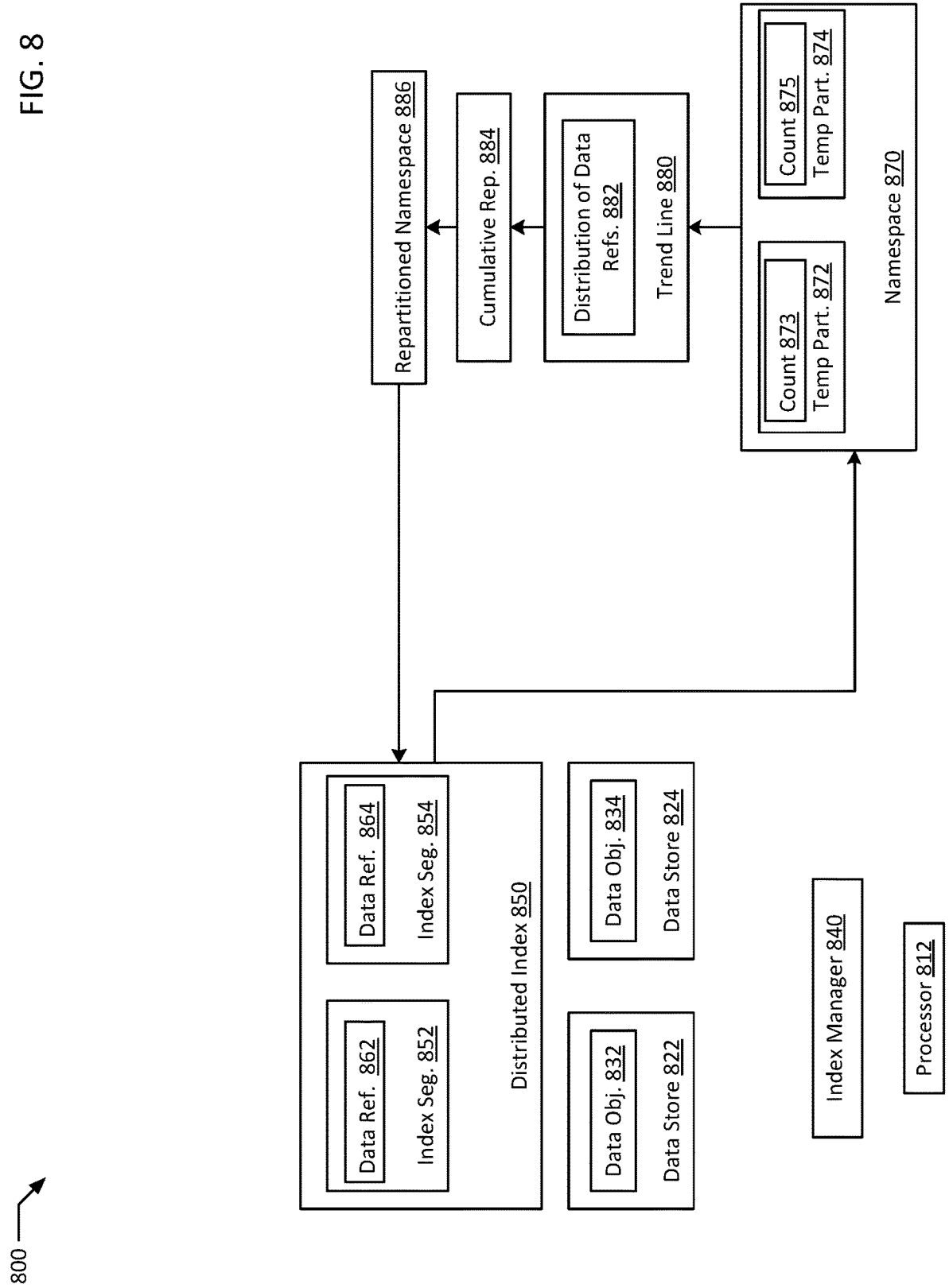
FIG. 8 is block diagram of an efficient distributed indexing of clumpy data system according to an example of the present disclosure.

FIG. 8 is block diagram of an efficient distributed indexing of clumpy data system according to an example of the present disclosure. Example system 800 includes data stores 822 and 824 storing data objects 832 and 834, where data references 862 and 864 respective data objects 832 and 834 are recorded on distributed index 850, and index manager 840 executes on processor 812 to temporarily partition namespace 870 of data references 862 and 864 into temporary partitions 872 and 874. Counts 873 and 875 of data references in temporary partitions 872 and 874 are computed. Trend line 880 approximating distribution of data references 882 is computed based on counts 873 and 875. Cumulative representation 884 of distribution of data references 882 is calculated based on trend line 880. Namespace 870 is repartitioned based on cumulative representation 884 resulting in repartitioned namespace 886, and distributed index 850 is divided into index segments 852 and 854 based on repartitioned namespace 886.

Figure 9:
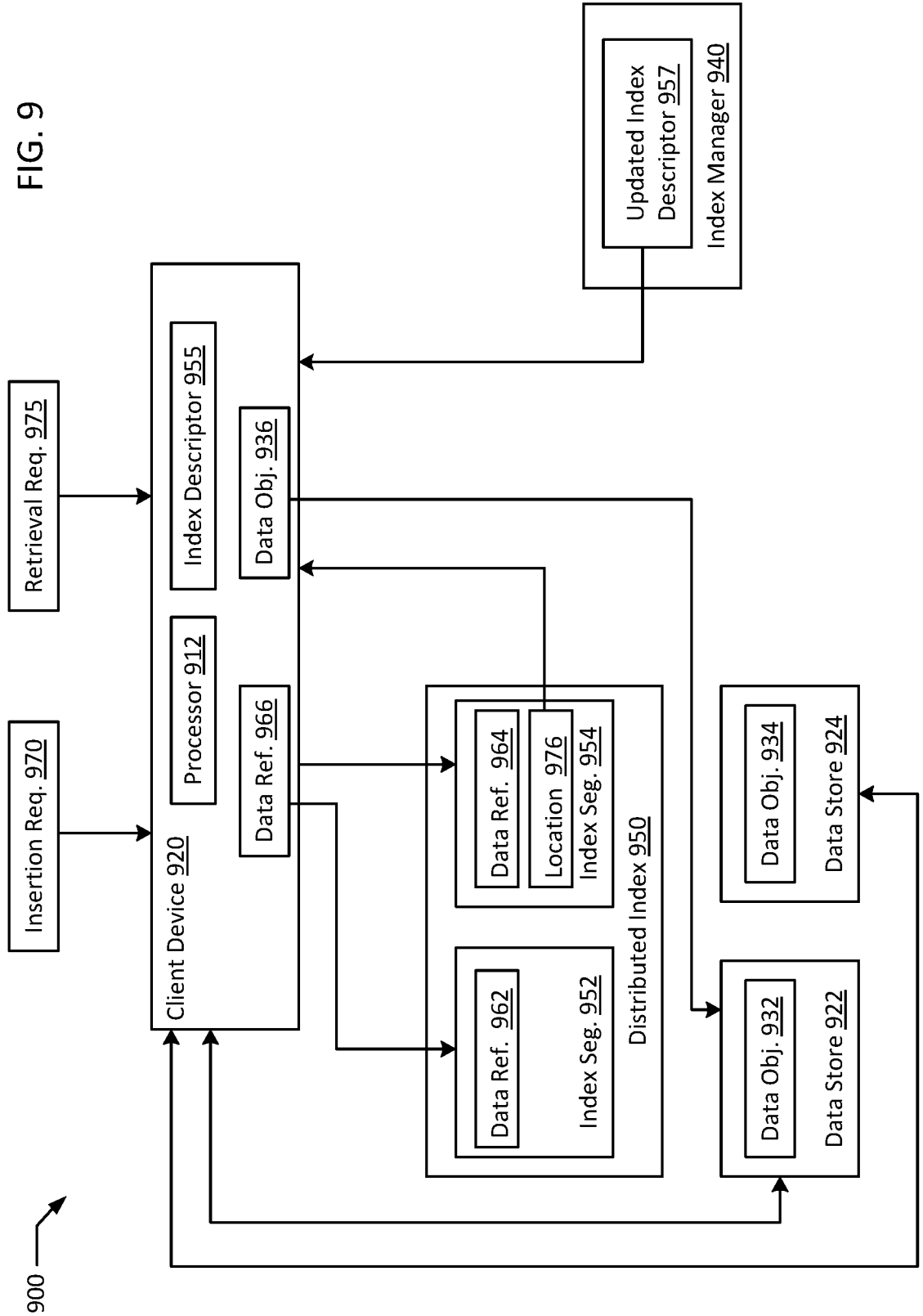
FIG. 9 is block diagram of an example of data storage and retrieval in a system employing efficient distributed indexing of clumpy data according to an example of the present disclosure.

FIG. 9 is block diagram of an example of data storage and retrieval in a system employing efficient distributed indexing of clumpy data according to an example of the present disclosure. Example system 900 includes data stores 922 and 924 storing data objects 932 and 934, where data references 962 and 964 to respective data objects 932 and 934 are recorded on distributed index 950. Client device 920 is communicatively coupled data stores 922 and 924 with processor 912 of client device 920 receiving insertion request 970 to store data object 936 identified by data reference 966 to data stores 922 and 924. Index segment 952 of data reference 966 is computed based on index descriptor 955. Data reference 966 is inserted into index segment 952 and data object 936 into data store 922. Updated index descriptor 957 is received from index manager 940. Retrieval request 975 to retrieve data object 936 is received. Data reference 966 is computed to be in index segment 954 based on updated index descriptor 957. Index segment 954 is queried for location 976 of data object 936.

Efficient distributed indexing of data enables distributed indexes of data objects in distributed storage environments to be computed in a fast and efficient manner while generating index segments that perform advantageously based on typical object naming schemes observed in large distributed storage environments (e.g., multi-tenant clouds). Without incurring the computational and latency overhead of determining the exact universe of object names in a distributed storage system, a representative sampling of the clustering tendencies of object names as distributed over the allowed namespace of object names in the storage system may be taken. In an example, this representative sampling may be at greater or lesser granularity based on the distribution of object names and index calculation efficiency considerations. In addition, instead of transmitting a large index of index segments over a network, a relatively short mathematical formula and its corresponding coefficients may be transmit instead to represent the index of index segments in a distributed index. The actual index file is therefore significantly smaller, which is advantageous because the calculation time expended to calculate an index segment as disclosed herein is may be comparable with a lookup from a more typical index file, while the network transmission times are significantly reduced with the smaller index. In addition, by implementing unified index segments for similar object names, object name based searches and retrievals may be performed on a very limited set of easily identifiable index segments. Queries may also retrieve multiple data references from the same index segment rather than piecing together responses from a wide array of index segments. Wasted querying time is also significantly reduced since the index segments likely to contain results may be pre-identified. Therefore, by implementing efficient distributed indexing of clumpy data, distributed storage systems may have an easily scalable indexing solution that can flexibly adapt to the data characteristics of the data objects stored in the distributed storage system while increasing network and processor efficiency.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a plurality of data stores storing a plurality of data objects, wherein a plurality of data references to each of the plurality of data objects is recorded on a distributed index; and an index manager executing on one or more processors to: temporarily partition a namespace of the plurality of data references into a plurality of temporary partitions; compute a respective count of data references in each temporary partition of the plurality of temporary partitions; calculate a trend line approximating a distribution of data references based on the respective counts; calculate a cumulative representation of the distribution of the data references based on the trend line; and repartition the namespace based on the cumulative representation resulting in a repartitioned namespace, wherein the distributed index is divided into index segments based on the repartitioned namespace.

In accordance with a 2nd exemplary aspect of the present disclosure, which may be used in combination with any one or more of other aspects described herein (e.g., the 1st aspect), wherein the plurality of data stores is distributed across a plurality of storage nodes. In accordance with a 3rd exemplary aspect of the present disclosure, which may be used in combination with any one or more of other aspects described herein (e.g., the 2nd aspect), wherein the index segments are distributed across the plurality of storage nodes. In accordance with a 4th exemplary aspect of the present disclosure, which may be used in combination with any one or more of other aspects described herein (e.g., the 3rd aspect), wherein the index segments are replicated across the plurality of storage nodes such that the loss of any given storage node fails to affect an integrity of the distributed index as a whole.

In accordance with a 5th exemplary aspect of the present disclosure, which may be used in combination with any one or more of other aspects described herein (e.g., the 1st aspect), wherein temporarily partitioning the namespace includes dividing the namespace into substantially equal sized temporary partitions based on a universe of possible data references. In accordance with a 6th exemplary aspect of the present disclosure, which may be used in combination with any one or more of other aspects described herein (e.g., the 5th aspect), wherein the universe of possible data references is all valid combinations of characters in a number of leading characters of a data reference.

In accordance with a 7th exemplary aspect of the present disclosure, which may be used in combination with any one or more of other aspects described herein (e.g., the 1st aspect), wherein the trend line is computed with a Discrete Fourier Series computation. In accordance with a 8th exemplary aspect of the present disclosure, which may be used in combination with any one or more of other aspects described herein (e.g., the 7th aspect), wherein a number of terms of the Discrete Fourier Series computation is determined based on the respective count of data references in each temporary partition.

In accordance with a 9th exemplary aspect of the present disclosure, which may be used in combination with any one or more of other aspects described herein (e.g., the 1st aspect), wherein the cumulative representation is computed by integrating the trend line, and the repartitioned namespace is generated by dividing the cumulative representation into substantially equal intervals. In accordance with a 10th exemplary aspect of the present disclosure, which may be used in combination with any one or more of other aspects described herein (e.g., the 1st aspect), wherein an index of the index segments includes a series of coefficients and a formula. In accordance with a 11th exemplary aspect of the present disclosure, which may be used in combination with any one or more of other aspects described herein (e.g., the 10th aspect), wherein the index of the index segments further includes an offset constant. In accordance with a 12th exemplary aspect of the present disclosure, which may be used in combination with any one or more of other aspects described herein (e.g., the 10th aspect), wherein the index of the index segments is transmitted to a client device, and the client device retrieves a first data object by: determining an index segment of a first data reference of the first data object based on the formula and the series of coefficients; and querying the index segment of the first data reference for a storage location of the first data object.

In accordance with a 13th exemplary aspect of the present disclosure, which may be used in combination with any one or more of other aspects described herein (e.g., the 1st aspect), wherein a client device stores a new data object by computing a first index segment of a new data reference of the new data object, and inserting the new data reference to the first index segment. In accordance with a 14th exemplary aspect of the present disclosure, which may be used in combination with any one or more of other aspects described herein (e.g., the 1st aspect), wherein the distributed index is periodically regenerated. In accordance with a 15th exemplary aspect of the present disclosure, which may be used in combination with any one or more of other aspects described herein (e.g., the 14th aspect), wherein one or more data references change index segments after the distributed index is regenerated. In accordance with a 16th exemplary aspect of the present disclosure, which may be used in combination with any one or more of other aspects described herein (e.g., the 1st aspect), wherein at least one of calculating the trend line and the cumulative representation includes determining a value of at least one of sine and cosine via look-up table.

Aspects of the subject matter described herein may be useful alone or in combination with one or more other aspects described herein. In a 17th exemplary aspect of the present disclosure, a method comprises temporarily partitioning a namespace of a plurality of data references into a plurality of temporary partitions; computing a respective count of data references in each temporary partition of the plurality of temporary partitions; calculating a trend line approximating a distribution of data references based on the respective counts; calculating a cumulative representation of the distribution of the data references based on the trend line; and repartitioning the namespace based on the cumulative representation resulting in a repartitioned namespace, wherein a distributed index of the plurality of data references is divided into index segments based on the repartitioned namespace.

Aspects of the subject matter described herein may be useful alone or in combination with one or more other aspects described herein. In a 18th exemplary aspect of the present disclosure, a system comprises a means for temporarily partitioning a namespace of a plurality of data references into a plurality of temporary partitions; a means for computing a respective count of data references in each temporary partition of the plurality of temporary partitions; a means for calculating a trend line approximating a distribution of data references based on the respective counts; a means for calculating a cumulative representation of the distribution of the data references based on the trend line; and a means for repartitioning the namespace based on the cumulative representation resulting in a repartitioned namespace, wherein a distributed index of the plurality of data references is divided into index segments based on the repartitioned namespace.

Aspects of the subject matter described herein may be useful alone or in combination with one or more other aspects described herein. In a 19th exemplary aspect of the present disclosure, a computer-readable non-transitory storage medium storing executable instructions, which when executed by a computer system, cause the computer system to: temporarily partition a namespace of a plurality of data references into a plurality of temporary partitions; compute a respective count of data references in each temporary partition of the plurality of temporary partitions; calculate a trend line approximating a distribution of data references based on the respective counts; calculate a cumulative representation of the distribution of the data references based on the trend line; and repartition the namespace based on the cumulative representation resulting in a repartitioned namespace, wherein a distributed index of the plurality of data references is divided into index segments based on the repartitioned namespace.

In accordance with a 20th exemplary aspect of the present disclosure, which may be used in combination with any one or more of other aspects described herein (e.g., the 17th, 18th, or 19th aspects), wherein a plurality of data stores storing a plurality of data objects associated with the plurality of data references is distributed across a plurality of storage nodes. In accordance with a 21st exemplary aspect of the present disclosure, which may be used in combination with any one or more of other aspects described herein (e.g., the 20th aspect), wherein the index segments are distributed across the plurality of storage nodes. In accordance with a 22nd exemplary aspect of the present disclosure, which may be used in combination with any one or more of other aspects described herein (e.g., the 21st aspect), wherein the index segments are replicated across the plurality of storage nodes such that the loss of any given storage node fails to affect an integrity of the distributed index as a whole.

In accordance with a 23rd exemplary aspect of the present disclosure, which may be used in combination with any one or more of other aspects described herein (e.g., the 17th, 18th, or 19th aspects), wherein temporarily partitioning the namespace includes dividing the namespace into substantially equal sized temporary partitions based on a universe of possible data references. In accordance with a 24th exemplary aspect of the present disclosure, which may be used in combination with any one or more of other aspects described herein (e.g., the 23rd aspect), wherein the universe of possible data references is all valid combinations of characters in a number of leading characters of a data reference.

In accordance with a 25th exemplary aspect of the present disclosure, which may be used in combination with any one or more of other aspects described herein (e.g., the 17th, 18th, or 19th aspects), wherein the trend line is computed with a Discrete Fourier Series computation. In accordance with a 26th exemplary aspect of the present disclosure, which may be used in combination with any one or more of other aspects described herein (e.g., the 25th aspect), wherein a number of terms of the Discrete Fourier Series computation is determined based on the respective count of data references in each temporary partition.

In accordance with a 27th exemplary aspect of the present disclosure, which may be used in combination with any one or more of other aspects described herein (e.g., the 17th, 18th, or 19th aspects), wherein the cumulative representation is computed by integrating the trend line, and the repartitioned namespace is generated by dividing the cumulative representation into substantially equal intervals. In accordance with a 28th exemplary aspect of the present disclosure, which may be used in combination with any one or more of other aspects described herein (e.g., the 17th, 18th, or 19th aspects), wherein an index of the index segments includes a series of coefficients and a formula. In accordance with a 29th exemplary aspect of the present disclosure, which may be used in combination with any one or more of other aspects described herein (e.g., the 28th aspect), wherein the index of the index segments further includes an offset constant. In accordance with a 30th exemplary aspect of the present disclosure, which may be used in combination with any one or more of other aspects described herein (e.g., the 28th aspect), further comprising: retrieving a first data object by: determining an index segment of a first data reference of the first data object based on the formula and the series of coefficients; and querying the index segment of the first data reference for a storage location of the first data object.

In accordance with a 31st exemplary aspect of the present disclosure, which may be used in combination with any one or more of other aspects described herein (e.g., the 17th, 18th, or 19th aspects), further comprising: storing a new data object by: computing a first index segment of a new data reference of the new data object; and inserting the new data reference to the first index segment. In accordance with a 32nd exemplary aspect of the present disclosure, which may be used in combination with any one or more of other aspects described herein (e.g., the 17th, 18th, or 19th aspects), further comprising: periodically regenerating the distributed index. In accordance with a 33rd exemplary aspect of the present disclosure, which may be used in combination with any one or more of other aspects described herein (e.g., the 32nd aspect), wherein one or more data references change index segments after the distributed index is regenerated. In accordance with a 34th exemplary aspect of the present disclosure, which may be used in combination with any one or more of other aspects described herein (e.g., the 17th, 18th, or 19th aspects), wherein at least one of calculating the trend line and the cumulative representation includes determining a value of at least one of sine and cosine via look-up table.

Aspects of the subject matter described herein may be useful alone or in combination with one or more other aspects described herein. In a 35th exemplary aspect of the present disclosure, a system comprises a plurality of data stores storing a plurality of data objects, wherein a plurality of data references to each of the plurality of data objects is recorded on a distributed index; a client device communicatively coupled with the plurality of data stores; and one or more processors of the client device executing to: receive an insertion request to store a first data object identified by a first data reference to the plurality of data stores; compute a first index segment of the first data reference based on an index descriptor; insert the first data reference into the first index segment and the first data object to a first data store of the plurality of data stores; receive an updated index descriptor from an index manager; receive a retrieval request to retrieve the first data object; compute that the first data reference is in a different second index segment based on the updated index descriptor; and query the second index segment for a location of the first data object.

In accordance with a 36th exemplary aspect of the present disclosure, which may be used in combination with any one or more of other aspects described herein (e.g., the 35th aspect), wherein the index manager generates the updated index descriptor by: temporarily partitioning a namespace of the plurality of data references, including the first data reference, into a plurality of temporary partitions; computing a respective count of data references in each temporary partition of the plurality of temporary partitions; calculating a trend line approximating a distribution of data references based on the respective counts; calculating a cumulative representation of the distribution of the data references based on the trend line; and repartitioning the namespace based on the cumulative representation resulting in a repartitioned namespace, wherein the distributed index is divided into index segments based on the repartitioned namespace.

In accordance with a 37th exemplary aspect of the present disclosure, which may be used in combination with any one or more of other aspects described herein (e.g., the 35th aspect), wherein the first index segment is stored on a first node and the second index segment is stored on a different second node. In accordance with a 38th exemplary aspect of the present disclosure, which may be used in combination with any one or more of other aspects described herein (e.g., the 37th aspect), wherein the first data store is stored on a third node different from both the first node and the second node.

In accordance with a 39th exemplary aspect of the present disclosure, which may be used in combination with any one or more of other aspects described herein (e.g., the 35th aspect), wherein the client device stores a second data object related to the first data object, and a second data reference of the second data object is inserted in the second index segment based on the updated index descriptor. In accordance with a 40th exemplary aspect of the present disclosure, which may be used in combination with any one or more of other aspects described herein (e.g., the 39th aspect), wherein one query to the second index segment retrieves both the location of the first data object and a location of the second data object. In accordance with a 41th exemplary aspect of the present disclosure, which may be used in combination with any one or more of other aspects described herein (e.g., the 39th aspect), wherein only the second index segment is queried for the location of the first data object and a location of the second data object based on the index descriptor. In accordance with a 42th exemplary aspect of the present disclosure, which may be used in combination with any one or more of other aspects described herein (e.g., the 39th aspect), wherein a query to the second index segment is redirected to a third index segment, which includes a replicated copy of the second index segment.

In accordance with a 43th exemplary aspect of the present disclosure, which may be used in combination with any one or more of other aspects described herein (e.g., the 35th aspect), wherein the index manager updates the index descriptor based on at least one of a timer, a count of changes, and an update request. In accordance with a 44th exemplary aspect of the present disclosure, which may be used in combination with any one or more of other aspects described herein (e.g., the 35th aspect), wherein the index descriptor and the updated index descriptor include at least one of a formula associated with the distributed index and a plurality of coefficients associated with the distributed index.

Aspects of the subject matter described herein may be useful alone or in combination with one or more other aspects described herein. In a 45th exemplary aspect of the present disclosure, a method comprises receiving an insertion request to store a first data object identified by a first data reference to a plurality of data stores; computing a first index segment of the first data reference based on an index descriptor of a distributed index storing a plurality of data references of a respective plurality of data objects; inserting the first data reference into the first index segment and the first data object to a first data store of the plurality of data stores; receiving an updated index descriptor from an index manager; receiving a retrieval request to retrieve the first data object; computing that the first data reference is in a different second index segment based on the updated index descriptor; and querying the second index segment for a location of the first data object.

Aspects of the subject matter described herein may be useful alone or in combination with one or more other aspects described herein. In a 46th exemplary aspect of the present disclosure, a system comprises a means for receiving an insertion request to store a first data object identified by a first data reference to a plurality of data stores; a means for computing a first index segment of the first data reference based on an index descriptor of a distributed index storing a plurality of data references of a respective plurality of data objects; a means for inserting the first data reference into the first index segment and the first data object to a first data store of the plurality of data stores; a means for receiving an updated index descriptor from an index manager; a means for receiving a retrieval request to retrieve the first data object; a means for computing that the first data reference is in a different second index segment based on the updated index descriptor; and a means for querying the second index segment for a location of the first data object.

Aspects of the subject matter described herein may be useful alone or in combination with one or more other aspects described herein. In a 47th exemplary aspect of the present disclosure, a computer-readable non-transitory storage medium storing executable instructions, which when executed by a computer system, cause the computer system to: receive an insertion request to store a first data object identified by a first data reference to a plurality of data stores; compute a first index segment of the first data reference based on an index descriptor of a distributed index storing a plurality of data references of a respective plurality of data objects; insert the first data reference into the first index segment and the first data object to a first data store of the plurality of data stores; receive an updated index descriptor from an index manager; receive a retrieval request to retrieve the first data object; compute that the first data reference is in a different second index segment based on the updated index descriptor; and query the second index segment for a location of the first data object.

In accordance with a 48th exemplary aspect of the present disclosure, which may be used in combination with any one or more of other aspects described herein (e.g., the 45th, 46th, or 47th aspects), further comprising generating the updated index descriptor by: temporarily partitioning a namespace of a plurality of data references, including the first data reference, into a plurality of temporary partitions; computing a respective count of data references in each temporary partition of the plurality of temporary partitions; calculating a trend line approximating a distribution of data references based on the respective counts; calculating a cumulative representation of the distribution of the data references based on the trend line; and repartitioning the namespace based on the cumulative representation resulting in a repartitioned namespace, wherein the distributed index is divided into index segments based on the repartitioned namespace.

In accordance with a 49th exemplary aspect of the present disclosure, which may be used in combination with any one or more of other aspects described herein (e.g., the 45th, 46th, or 47th aspects), wherein the first index segment is stored on a first node and the second index segment is stored on a different second node. In accordance with a 50th exemplary aspect of the present disclosure, which may be used in combination with any one or more of other aspects described herein (e.g., the 49th aspect), wherein the first data store is stored on a third node different from both the first node and the second node.

In accordance with a 51st exemplary aspect of the present disclosure, which may be used in combination with any one or more of other aspects described herein (e.g., the 45th, 46th, or 47th aspects), further comprising: storing a second data object related to the first data object; and inserting a second data reference of the second data object in the second index segment based on the updated index descriptor. In accordance with a 52nd exemplary aspect of the present disclosure, which may be used in combination with any one or more of other aspects described herein (e.g., the 51st aspect), wherein one query to the second index segment retrieves both the location of the first data object and a location of the second data object. In accordance with a 53rd exemplary aspect of the present disclosure, which may be used in combination with any one or more of other aspects described herein (e.g., the 51st aspect), wherein only the second index segment is queried for the location of the first data object and a location of the second data object based on the index descriptor. In accordance with a 54th exemplary aspect of the present disclosure, which may be used in combination with any one or more of other aspects described herein (e.g., the 51st aspect), wherein a query to the second index segment is redirected to a third index segment, which includes a replicated copy of the second index segment.

In accordance with a 55th exemplary aspect of the present disclosure, which may be used in combination with any one or more of other aspects described herein (e.g., the 45th, 46th, or 47th aspects), further comprising: updating the index descriptor based on at least one of a timer, a count of changes, and an update request. In accordance with a 56th exemplary aspect of the present disclosure, which may be used in combination with any one or more of other aspects described herein (e.g., the 45th, 46th, or 47th aspects), wherein the index descriptor and the updated index descriptor include at least one of a formula associated with the distributed index and a plurality of coefficients associated with the distributed index.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a plurality of data stores storing a plurality of data objects, wherein a plurality of data references to each of the plurality of data objects is recorded on a distributed index; and
an index manager executing on one or more processors to:
temporarily partition a namespace of the plurality of data references into a plurality of temporary partitions;
compute a respective count of data references in each temporary partition of the plurality of temporary partitions;
calculate a trend line approximating a distribution of data references based on each of the respective counts;
calculate a cumulative representation of the distribution of the data references based on the trend line; and
after temporarily partitioning the namespace, repartition the namespace based on the cumulative representation resulting in a repartitioned namespace, wherein the distributed index is divided into index segments based on the repartitioned namespace.

2. The system of claim 1, wherein the plurality of data stores is distributed across a plurality of storage nodes and the index segments are distributed across the plurality of storage nodes.

3. The system of claim 2, wherein the index segments are replicated across the plurality of storage nodes such that a loss of any given storage node fails to affect an integrity of the distributed index as a whole.

4. The system of claim 1, wherein temporarily partitioning the namespace includes dividing the namespace into substantially equal sized temporary partitions based on a universe of possible data references.

5. The system of claim 4, wherein the universe of possible data references is all valid combinations of characters in a number of leading characters of a data reference.

6. The system of claim 1, wherein the trend line is computed with a Discrete Fourier Series computation and a number of terms of the Discrete Fourier Series computation is determined based on the respective count of data references in each temporary partition.

7. The system of claim 1, wherein the cumulative representation is computed by integrating the trend line, and the repartitioned namespace is generated by dividing the cumulative representation into substantially equal intervals.

8. The system of claim 1, wherein an index of the index segments includes a series of coefficients and a formula.

9. The system of claim 8, wherein the index of the index segments is transmitted to a client device, and the client device retrieves a first data object by:
   determining an index segment of a first data reference of the first data object based on the formula and the series of coefficients; and
   querying the index segment of the first data reference for a storage location of the first data object.

10. The system of claim 1, wherein a client device stores a new data object by computing a first index segment of a new data reference of the new data object, and inserting the new data reference to the first index segment.

11. The system of claim 1, wherein the distributed index is periodically regenerated and one or more data references change index segments after the distributed index is regenerated.

12. The system of claim 1, wherein at least one of calculating the trend line and the cumulative representation includes determining a value of at least one of sine and cosine via look-up table.

13. A method comprising:
   temporarily partitioning, by at least one processor, a namespace of a plurality of data references into a plurality of temporary partitions;
   computing, by the at least one processor, a respective count of data references in each temporary partition of the plurality of temporary partitions;
   calculating, by the at least one processor, a trend line approximating a distribution of data references based on each of the respective counts;
   calculating, by the at least one processor, a cumulative representation of the distribution of the data references based on the trend line; and
   after temporarily partitioning the namespace, repartitioning, by the at least one processor, the namespace based on the cumulative representation resulting in a repartitioned namespace, wherein a distributed index of the plurality of data references is divided into index segments based on the repartitioned namespace.

14. The method of claim 13, further comprising:
   retrieving a first data object by:
      determining an index segment of a first data reference of the first data object based on a formula and a series of coefficients; and
      querying the index segment of the first data reference for a storage location of the first data object; and
   storing a second data object by:
      computing a first index segment of a second data reference of the second data object; and
      inserting the second data reference to the first index segment.

* * * * *

UNITED STATES PATENT AND TRADEMARK OFFICE
CERTIFICATE OF CORRECTION

PATENT NO. : 10,929,466 B2  
APPLICATION NO. : 15/980347  
DATED : February 23, 2021  
INVENTOR(S) : Ivancich et al.

Page 1 of 1

It is certified that error appears in the above-identified patent and that said Letters Patent is hereby corrected as shown below:

In the Specification

In Column 6, Line 2, replace "VIVID" with --VMD--.

In Column 6, Line 9, replace "VIVID" with --VMD--.

In Column 6, Line 27, replace "VIVID" with --VMD--.

In Column 10, Line 21, replace "dumpiness" with --clumpiness--.

In Column 15, Lines 6-7, replace "dumpiness" with --clumpiness--.

In Column 18, Line 60, replace "dumpiness" with --clumpiness--.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*